(12) United States Patent
Tamura et al.

(10) Patent No.: US 10,536,029 B2
(45) Date of Patent: Jan. 14, 2020

(54) POWER CONVERSION SYSTEM AND CONNECTOR

(71) Applicant: Panasonic Intellectual Property Management Co., Ltd., Osaka (JP)

(72) Inventors: Hideki Tamura, Shiga (JP); Takuya Kagawa, Kyoto (JP); Kazunori Kidera, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 670 days.

(21) Appl. No.: 14/786,447

(22) PCT Filed: Apr. 23, 2014

(86) PCT No.: PCT/JP2014/002292
§ 371 (c)(1),
(2) Date: Oct. 22, 2015

(87) PCT Pub. No.: WO2014/174842
PCT Pub. Date: Oct. 30, 2014

(65) Prior Publication Data
US 2016/0072341 A1    Mar. 10, 2016

(30) Foreign Application Priority Data

Apr. 24, 2013 (JP) .................... 2013-091627
Apr. 24, 2013 (JP) .................... 2013-091628
(Continued)

(51) Int. Cl.
*B60L 53/16* (2019.01)
*H02J 9/06* (2006.01)

(52) U.S. Cl.
CPC .................... *H02J 9/061* (2013.01)

(58) Field of Classification Search
CPC ......... H02J 9/061; B60L 11/1868; B60L 3/00; B60L 3/04; B60L 11/185; B60L 11/1842;
(Continued)

(56) References Cited

U.S. PATENT DOCUMENTS 9,346,365 B1 *   5/2016   Penilla ............... G06Q 30/0265
2002/0116092 A1 * 8/2002   Hamamatsu ............ H02H 3/05
                                                          700/295
(Continued)

FOREIGN PATENT DOCUMENTS

EP    0 644 625 A2    3/1995
EP    2 690 741 A1    1/2014
(Continued)

OTHER PUBLICATIONS

Extended European Search Report dated Nov. 10, 2016 for corresponding European Application No. 14787440.8.
(Continued)

*Primary Examiner* — Jared Fureman
*Assistant Examiner* — Emmanuel Dominique
(74) *Attorney, Agent, or Firm* — Renner, Otto, Boiselle & Sklar, LLP

(57) ABSTRACT

A power conversion system includes a power conversion device, a connector, and a processing module. The power conversion device is connected to a power system. The attached state and the unattached state of the connector relative to a connecting port that is provided in an apparatus having a battery mounted therein can be selected. The processing module is configured to determine that a malfunction has occurred when a voltage is applied to a portion that electrically connects the connector and the connecting port in a period in which transmission of electric power with respect to the battery is stopped.

24 Claims, 14 Drawing Sheets

(30) Foreign Application Priority Data

Apr. 24, 2013 (JP) .................................. 2013-091629
Aug. 28, 2013 (JP) .................................. 2013-177324

(58) Field of Classification Search
CPC .............. B60L 11/1851; B60L 11/1818; B60L 11/1838; B60L 2270/30; B60L 2250/10; B60L 2250/16; B60L 2250/24; H01M 10/44; Y02T 10/7066; Y02T 90/01; Y02E 60/721; Y04S 10/126

See application file for complete search history.

(56) References Cited

U.S. PATENT DOCUMENTS

| | | | |
|---|---|---|---|
| 2009/0102433 A1 | 4/2009 | Kamaga | |
| 2010/0241299 A1 | 9/2010 | Ito et al. | |
| 2010/0289516 A1* | 11/2010 | Mitsutani | B60L 3/00 324/764.01 |
| 2011/0133715 A1* | 6/2011 | Zushi | G01R 31/024 323/285 |
| 2012/0126747 A1 | 5/2012 | Kiko et al. | |
| 2012/0234061 A1 | 9/2012 | Inoue et al. | |
| 2012/0274275 A1* | 11/2012 | Baek | H02J 5/00 320/109 |
| 2012/0319648 A1 | 12/2012 | Ohtomo | |
| 2013/0093427 A1 | 4/2013 | Bemrich et al. | |
| 2013/0137286 A1* | 5/2013 | Smith | E05B 47/026 439/304 |
| 2014/0035527 A1* | 2/2014 | Hayashigawa | B60L 53/305 320/109 |
| 2014/0091759 A1* | 4/2014 | Kagawa | B60L 53/305 320/109 |
| 2014/0132212 A1 | 5/2014 | Ichikawa et al. | |
| 2014/0232182 A1* | 8/2014 | Kinomura | B60L 53/18 307/10.1 |
| 2014/0306659 A1* | 10/2014 | Nakajima | B60L 53/14 320/109 |
| 2017/0232858 A1* | 8/2017 | Heuer | B60L 11/1818 320/109 |

FOREIGN PATENT DOCUMENTS

| | | |
|---|---|---|
| JP | 11095624 | 4/1999 |
| JP | 2000-173428 A | 6/2000 |
| JP | 2001-268671 A | 9/2001 |
| JP | 2003-169401 A | 6/2003 |
| JP | 2007-305365 A | 11/2007 |
| JP | 2008-043051 A | 2/2008 |
| JP | 2009-106053 A | 5/2009 |
| JP | 2009-130940 A | 6/2009 |
| JP | 2010142088 | 6/2010 |
| JP | 2010-183795 A | 8/2010 |
| JP | 2010-226840 A | 10/2010 |
| JP | 2011-139572 A | 7/2011 |
| JP | 2012-151938 A | 8/2012 |
| JP | 2013-5615 A | 1/2013 |
| JP | 2013-031348 A | 2/2013 |
| JP | 2013-51772 A | 3/2013 |
| JP | 2013-070465 A | 4/2013 |
| JP | 2013-074762 A | 4/2013 |
| WO | WO 2012/127649 A1 | 9/2012 |

OTHER PUBLICATIONS

International Search Report for corresponding International Application No. PCT/JP2014/002292 dated Jul. 15, 2014 and English translation.

Form PCT/ISA/237 for corresponding International Application No. PCT/JP2014/002292 dated Jul. 15, 2014.

Supplemental Partial European Search Report dated Jun. 28, 2016 for corresponding European Application No. 14787440.8.

* cited by examiner

POWER CONVERSION SYSTEM AND CONNECTOR

TECHNICAL FIELD

The present invention generally relates to a power conversion system and a connector, and more particularly, to a power conversion system that enables electric power of a battery mounted in an apparatus to be supplied to a power system and a connector configured to be connected to the apparatus.

BACKGROUND ART

In recent years, from the consideration of limited resources and environmental issues, electric vehicles in which a storage battery is mounted as a travelling energy source are gathering attention. Moreover, a charger/discharger including a main body, a cable, and a charge/discharge connector in order to charge or discharge a storage battery mounted in an electric vehicle has been proposed (for example, Document 1 (JP Pub. No. 2013-31348)).

In the main body of the charger/discharger disclosed in Document 1, an electromagnet switching device that interrupts current flowing in the cable when the value of the current is a predetermined value or higher is provided in the charge/discharge connector. Further, Document 1 also discloses a technique of supplying electric power from a storage battery to household electrical appliances.

However, the charger/discharger disclosed in Document 1 does not have a function of detecting the presence or absence of a malfunction in the electromagnet switching device provided in the charge/discharge connector. Thus, it is not possible to immediately take countermeasures such as sending an alarm notification or the like to users even when a malfunction such as weld of the electromagnet switching device in the charge/discharge connector occurs.

SUMMARY OF INVENTION

An object of the present invention is to provide a power conversion system capable of detecting a malfunction in a period in which transmission of electric power between a connector and a battery is stopped. Another object of the present invention is to provide a connector which is inhibited from being removed from an apparatus when a malfunction is detected.

A power conversion system according to the present invention includes: a power conversion device configured to be connected to a power system; a connector whose attached state and unattached state relative to a connecting port provided in an apparatus having a battery mounted therein can be selected; and a processing module configured to determine that a malfunction has occurred when a voltage is applied to a portion that electrically connects the connector and the connecting port in a period in which transmission of electric power with respect to the battery is stopped.

Another power conversion system of the present invention includes: a conversion circuit configured to convert electric power from a first battery mounted in an apparatus into electric power that is supplied to a power system; a control circuit configured to control an operation of the conversion circuit; a control power supply configured to receive electric power from at least one of the power system and the conversion circuit and to supply electric power to the control circuit; and a connector whose attached state and unattached state relative to a connecting port provided in the apparatus can be selected and which forms an electric path between the first battery and the conversion circuit, wherein the connector forms an auxiliary electric path along which electric power is supplied from a second battery mounted in the apparatus to the control power supply.

A connector of the present invention includes: a body whose attached state and unattached state relative to a connecting port provided in an apparatus having a battery mounted therein can be selected; a switching mechanism that includes an actuator and is configured, when the body is in the attached state relative to the connecting port, to select between a lock state in which removal of the body from the connecting port is inhibited and an unlock state in which removal of the body from the connecting port is allowed; a first power feeding module configured to supply electric power from a power conversion device connected to a power system to the actuator; and a second power feeding module configured to supply electric power from at least the apparatus, of the power conversion device and the apparatus, to the actuator, wherein the actuator is configured to place the switching mechanism in the lock state in a period in which electric power is supplied and to place the switching mechanism in the unlock state in a period in which electric power is not supplied.

Another connector of the present invention includes: a body whose attached state and unattached state relative to a connecting port provided in an apparatus having a battery mounted therein can be selected; a switching mechanism that includes a latch-type actuator configured to operate, when a pulsed driving voltage is applied, and that is configured, when the body is in the attached state relative to the connecting port, to select between a lock state in which removal of the body from the connecting port is inhibited and an unlock state in which removal of the body from the connecting port is allowed; a processing module configured to determine that a malfunction has occurred when a voltage is applied to a portion that electrically connects the connector and the connecting port in a period in which transmission of electric power with respect to the battery is stopped; and a disabling circuit configured to disable the driving voltage so that the driving voltage that places the switching mechanism in the unlock state is not applied to the actuator in a period in which the processing module has determined that a malfunction had occurred.

According to the configuration of the power conversion system of the present invention, it is possible to obtain an advantage that a malfunction in a period in which transmission of electric power between a connector and a battery is stopped can be detected.

According to the configuration of the connector of the present invention, it is possible to obtain an advantage that the connector is inhibited from being removed from an apparatus when a malfunction is detected by a processing module.

BRIEF DESCRIPTION OF DRAWINGS

Preferred embodiments of the invention will now be described in further details. Other features and advantages of the present invention will become better understood with regard to the following detailed description and accompanying drawings wherein.

DESCRIPTION OF EMBODIMENTS

Figure 1:
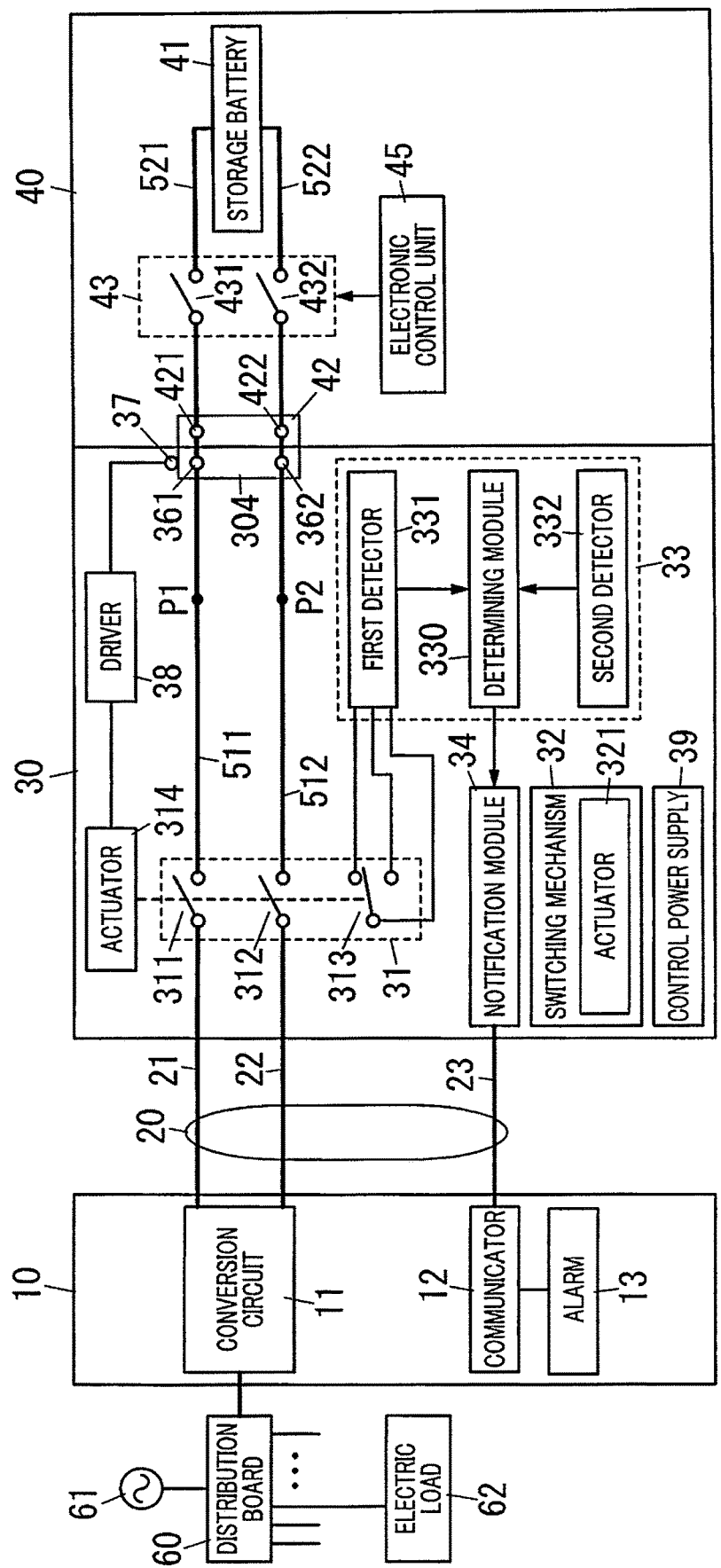
FIG. 1 is a block diagram illustrating a configuration that is common to Embodiments 1 and 2.

Hereinafter, a case in which an apparatus is an electric vehicle having a battery serving as a travelling energy source mounted therein will be described. However, the apparatus is not limited to the electric vehicle. That is, a connector described below may be used in an apparatus, in a housing of which a battery is stored. The battery is generally assumed to be a storage battery and may be a fuel cell battery. Moreover, the capacity of a storage battery is 1 kWh or higher, for example, and a maximum output power of the battery is preferably 0.5 kW or higher, for example.

In the following description, an electric vehicle is assumed to be an electric car that travels by driving a motor which is an engine using a battery as a travelling energy source. However, the electric vehicle may be a hybrid car (which may be a parallel type, a series type, or a split type) having an internal combustion engine and a motor, a plug-in hybrid car having a power conversion device, a fuel cell vehicle having a fuel cell battery mounted therein, or other vehicles. That is, the electric vehicle may be a vehicle which includes a battery as a travelling energy source and in which electric power is transmitted through a connector. Thus, the electric vehicle may be an electric motorcycle.

In this example, since the electric vehicle is assumed to be an electric car having a storage battery which is a travelling energy source mounted therein, a power conversion device is provided for charging the storage battery. The power conversion device has a function of converting electric power received from a power supply such as a system power supply or a distributed power supply into electric power ideal for charging the storage battery mounted in the electric vehicle and a function of converting the electric power of the storage battery into electric power corresponding to a system power supply.

That is, the power conversion device is configured to convert electric power bidirectionally between a power supply and a storage battery. The storage battery mounted in the electric vehicle can be charged from a system power supply or a distributed power supply through the power conversion device and can supply electric power to an electric path connected to a system power supply through the power conversion device. The electric vehicle has a connecting port and the connecting port has a connection portion electrically connected to the storage battery. The connector includes a body whose attached state and unattached state relative to the connecting port can be selected and a contactor configured to be electrically connected to the power conversion device. When the connector is attached to the connecting port, the connection portion of the connecting port is electrically connected to the contactor of the power connector.

When the power conversion device is installed in a house of a user who uses the electric vehicle, the power conversion device is electrically connected to a power system through a distribution board disposed in the house. Moreover, when the power conversion device is installed in a place used by the general public, the power conversion device is connected to the power system through a distribution board or is directly connected to the power system. In the embodiments below, the power conversion device is assumed to be installed in a house.

That is, the power conversion device has a function of converting AC electric power supplied from a system power supply or a distributed power supply such as a photovoltaic power generation system installed in a house into DC electric power and charging the storage battery with the DC electric power. Moreover, the power conversion device has a function of converting DC electric power discharged by the storage battery into AC electric power and supplying the AC electric power to electric loads used in a house through a distribution board connected to a power system. The function of supplying electric power to electric loads using the electric power of a storage battery is referred to as V2H (Vehicle to Home). The power conversion device may be configured to implement only one of charge and discharge of the storage battery as long as electric power is transmitted between the power conversion device and the storage battery.

In the following embodiments, although the power conversion device is assumed to be installed in a detached house, the technique described in the embodiments can be employed in a parking lot of various facilities such as an apartment building, a commercial facility, an industrial facility, or an airport.

Hereinafter, a case in which the CHAdeMO (trademark) method is employed as a charging method for storage batteries mounted in electric vehicles will be described as an example. In this charging method, an ECU (electronic control unit) mounted in an electric vehicle calculates a current value required for charging based on information on the state of a storage battery such as a remaining capacity of the storage battery or the temperature of the storage battery. Moreover, the power conversion device receives an instruction on the current value required for charging from an electric vehicle according to CAN (controller area network) communication and controls the output current value according to the instruction. However, the connector described in the following embodiments can be applied to other charging methods.

In the embodiments described below, a power conversion system that includes a power conversion device and a connector will be described. However, the connector described below may be combined with a power conversion device having a configuration other than the configuration described in the embodiments.

Embodiment 1

As illustrated in FIG. 1, a power conversion system described below includes a power conversion device 10 and a connector 30. The power conversion device 10 includes a conversion circuit 11 configured to convert AC and DC electric power bidirectionally. A housing of the power conversion device 10 may be a wall-mounted housing attached to a wall of a house or a stationary housing installed on a ground surface. The conversion circuit 11 is configured to be electrically connected to a distribution board 60 provided in the house and connected to the connector 30 with a cable 20. The distribution board 60 allows a main circuit connected to a system power supply 61 to branch into a plurality of systems of branch circuits. An electric load 62 is electrically connected to the branch circuit.

The conversion circuit 11 has a function of converting AC electric power supplied from the distribution board 60 into DC electric power having a voltage value suitable for a storage battery 41 mounted in an electric vehicle 40 and a function of converting DC electric power output from the storage battery 41 of the electric vehicle 40 into AC electric power equivalent to the system power supply 61. The AC electric power converted from the DC electric power output from the storage battery 41 is supplied to the distribution board 60. The AC electric power is generally supplied to the electric load 62 in a house.

A terminal voltage of the storage battery 41 is selected from the range of 50 to 600 V, for example. Moreover, since the AC electric power transmitted between the conversion circuit 11 and the distribution board 60 is equivalent to the system power supply 61, an effective voltage value is 100 V or 200 V and the frequency is 50 Hz or 60 Hz, for example.

The electric vehicle 40 has a connecting port 42 and the connecting port 42 has contactors 421 and 422 electrically connected to the storage battery 41. Moreover, the connecting port 42 has a socket 425 (see FIG. 2) in which a portion of the connector 30 can be inserted. That is, the connecting port 42 forms an inlet. A step 426 is formed in an inner surface of the socket 425. The step 426 is formed in such a shape that an inner surface on a deeper side than an inner surface close to the opening in a direction in which the connector 30 is inserted in the socket 425 is depressed.

Figure 2:
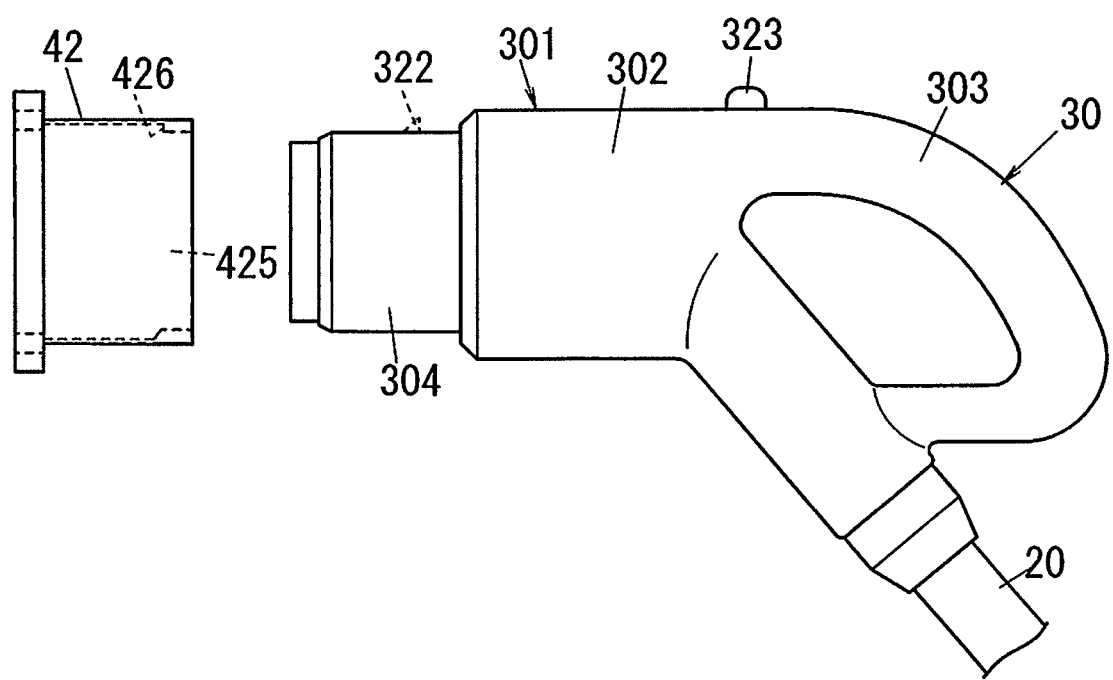
FIG. 2 is a side view illustrating a connector and a connecting port used in Embodiment 1.

On the other hand, as illustrated in FIG. 2, the connector 30 has a body 301 whose attached state and unattached state relative to the connecting port 42 can be selected. That is, a portion of the body 301 has a shape that conforms to the socket 425 of the connecting port 42 and is formed so as to be inserted in the socket 425. The body 301 of the connector 30 includes a cylindrical portion 302 and a grip 303 extending backward from the cylindrical portion 302, and the cable 20 is extended from a rear end of the grip 303.

A circular opening is formed in a front surface of the cylindrical portion 302. A columnar insertion portion 304 that is inserted in the socket 425 of the connecting port 42 protrudes forward from the opening of the cylindrical portion 302. A plurality of holes (not illustrated) is formed in a front surface of the insertion portion 304, and pin-shaped contactors configured to be electrically connected to the contactors provided in the connecting port 42 are disposed in the holes. Although FIG. 1 illustrates two contactors 421 and 422 provided in the connecting port 42 and two contactors 361 and 362 provided in the connector 30, additional contactors (not illustrated) are provided in the connecting port 42 and the insertion portion 304. The other contactors will be described later. Further, an exposure hole (not illustrated) for exposing a latch lever 322 is formed in an outer circumferential surface of the insertion portion 304.

The latch lever 322 is pulled into the insertion portion 304 when the body 301 is not attached to the connecting port 42. When the body 301 is attached to the connecting port 42, the insertion portion 304 moves relative to the cylindrical portion 302, and the switching mechanism 32 operates. As a result, the latch lever 322 moves so as to protrude outside the insertion portion 304 from the exposure hole. When the body 301 is attached to the connecting port 42, the latch lever 322 overlaps the step 426 formed in the connecting port 42. As a result, the insertion portion 304 is prevented from coming off from the connecting port 42.

A release button 323 is provided at a rear end of the cylindrical portion 302. When the body 301 is attached to the connecting port 42 and the release button 323 is pressed, the switching mechanism 32 operates and the latch lever 322 is pulled into the insertion portion 304. Thus, a state in which the body 301 is retained in the connecting port 42 is released. That is, the release button 323 is an operator for pulling the latch lever 322 into the insertion portion 304, and a state in which the latch lever 322 overlaps the step 426 is maintained until the release button 323 is operated. Thus, when the body 301 is attached to the connecting port 42, the body 301 of the connector 30 cannot be removed from the connecting port 42 until the release button 323 is pressed.

The latch lever 322 and the release button 323 are operated in synchronization by the switching mechanism 32 (see FIG. 1) provided in the connector 30. The switching mechanism 32 includes an actuator 321 that selects between a state in which movement of the release button 323 is allowed and a state in which movement of the release button 323 is inhibited.

The actuator 321 is preferably a linear solenoid with an electromagnet. Moreover, the electromagnet that forms the actuator 321 may be a non-polar electromagnet that does not have a permanent magnet and allows a plunger to advance and retract during conduction and non-conduction periods, respectively or a polar permanent electromagnet that has a permanent magnet and allows a plunger to advance and retract by applying a pulsed driving voltage for a short period. In the present embodiment, the actuator 321 is assumed to be a non-polar electromagnet that inhibits movement of the release button 323 during a conduction period.

That is, in a conduction period of the actuator 321, the switching mechanism 32 enters a lock state in which movement of the release button 323 is inhibited and removal of the body 301 from the connecting port 42 is inhibited. On the other hand, in a non-conduction period of the actuator 321, the switching mechanism 32 enters an unlock state in which movement of the release button 323 is allowed and removal of the body 301 from the connecting port 42 is allowed.

When the connector 30 is connected to the connecting port 42 of the electric vehicle 40, a user holds the connector 30 by grasping the grip 303 and inserts the insertion portion 304 into the socket 425 of the connecting port 42 along an axial direction of the insertion portion 304. When the body 301 of the connector 30 is pressed against the connecting port 42, the latch lever 322 is inserted up to the deeper side of the step 426 formed in the inner surface of the socket 425, and the insertion portion 304 relatively moves toward the cylindrical portion 302. When the insertion portion 304 moves relative to the cylindrical portion 302, the switching mechanism 32 allows the latch lever 322 to protrude from a side surface of the insertion portion 304. Thus, the latch lever 322 overlaps the step 426 and the connector 30 is held so as not to be removed from the connecting port 42. That is, the body 301 of the connector 30 is maintained in the attached state relative to the connecting port 42.

On the other hand, when the connector 30 is detached from the electric vehicle 40, the user holds the connector 30 by grasping the grip 303 and presses the release button 323. When the release button 323 is pressed, the switching mechanism 32 allows the latch lever 322 to be pulled from the side surface of the insertion portion 304 up to a position at which the latch lever 322 does not overlap the step 426. When the connector 30 is pulled in a direction of separating the connector 30 from the connecting port 42 while pressing the release button 323 to maintain the pulled state of the latch lever 322, the insertion portion 304 of the connector 30 is removed from the connecting port 42. That is, the body 301 of the connector 30 enters an unattached state relative to the connecting port 42.

The two contactors 361 and 362 held in the insertion portion 304 of the connector 30 are electrically connected to the conversion circuit 11 of the power conversion device 10 via the cable 20. When the connector 30 is attached to the connecting port 42, the contactors 361 and 362 of the connector 30 make contact with the contactors 421 and 422 of the connecting port 42. Thus, if the connector 30 is attached to the connecting port 42 of the electric vehicle 40, the conversion circuit 11 and the storage battery 41 are electrically connected to the cable 20 through electric paths 511 and 512 provided in the connector 30 and electric paths 521 and 522 provided in the electric vehicle 40. Here, the electric paths 511 and 512 are first electric paths and the electric paths 521 and 522 are second electric paths.

The power conversion device 10 includes a communicator 12 and an alarm 13 in addition to the conversion circuit 11. The communicator 12 is configured to be connected to the connector 30 via the cable 20. When the connector 30 is attached to the connecting port 42 of the electric vehicle 40, the communicator 12 can communicate with the electronic control unit 45 mounted in the electric vehicle 40 through the connector 30. The communicator 12 and the electronic control unit 45 communicate bidirectionally according to CAN communication, for example. Thus, the communicator 12 can receive information such as a terminal voltage of the storage battery 41, a remaining capacity of the storage battery 41, and the temperature of the storage battery 41 and send an instruction to the electronic control unit 45 as necessary.

The cable 20 that electrically connects the power conversion device 10 and the connector 30 includes a pair of power supply lines 21 and 22 which is a portion of an electric path between the conversion circuit 11 and the storage battery 41. That is, if the connector 30 is attached to the connecting port 42, the power supply lines 21 and 22 function as a portion of an electric path for transmitting electric power between the conversion circuit 11 and the storage battery 41. Here, in the illustrated example, the power supply line 21 is determined as a high potential side (positive-polarity) line and the power supply line 22 is determined as a low potential side (negative-polarity) line.

The cable 20 includes a signal line 23 for connection with the communicator 12 in addition to the power supply lines 21 and 22. The signal line 23 includes two communication lines for CAN communication and five control lines, for example. The communication line and the control line will be described later. If the connector 30 is attached to the connecting port 42, the signal line 23 is connected to the electronic control unit 45 of the electric vehicle 40 via the connector 30, and the communicator 12 of the power conversion device 1 can communicate with the electric vehicle 40 through the signal line 23. In FIG. 1, the communication line and the control line are not illustrated.

The electric vehicle 40 includes the storage battery 41 which is a travelling energy source and a switching device 43 as a second switching device with an electromagnetic contactor. The electromagnetic contactor is configured so that contacts are opened and closed by an electromagnet. The switching device 43 which is the second switching device is intervened in the electric paths 521 and 522 which are the second electric paths disposed between the storage battery 41 and the connecting port 42. The switching device 43 includes a contact 431 intervened in the high potential-side (positive-polarity) electric path 521 and a contact 432 intervened in the low potential-side (negative-polarity) electric path 522. That is, the switching device 43 includes a so-called double-pole contact.

The open state and the closed state of the switching device 43 can be selected by the electronic control unit 45 of the electric vehicle 40. The electronic control unit 45 allows the switching device 43 to enter the closed state upon receiving a notification from the power conversion device 10 when charging or discharging of the storage battery 41 starts. Moreover, the electronic control unit 45 allows the switching device 43 to enter the open state when charging or discharging of the storage battery 41 ends. That is, the contactors 421 and 422 provided in the connecting port 42 are electrically connected to the storage battery 41 through the contacts 431 and 432 in a period in which charging or discharging of the storage battery 41 is performed and are electrically separated from the storage battery 41 in a period in which charging or discharging of the storage battery 41 is not performed.

As described above, the connector 30 of the present embodiment includes the body 301 that can be attached to the connecting port 42 of the electric vehicle 40. Moreover, a switching device 31, a switching mechanism 32, and a processing module 33 are provided in the body 301 of the connector 30.

The switching device 31 is intervened in the electric paths 511 and 512 disposed between the power supply lines 21 and 22 of the cable 20 and the contactors 361 and 362. Specifically, the switching device 31 includes a contact 311 intervened in the electric path 511 between the power supply line 21 and the contactor 361 and a contact 312 intervened in the electric path 512 between the power supply line 22 and the contactor 362. That is, the switching device 31 includes a so-called double-pole contact. The two contacts 311 and 312 function as main contacts that select between conduction and non-conduction of the electric paths 511 and 512 and are opened and closed when external force is applied to an operator (not illustrated) of the switching device 31.

Moreover, the switching device 31 of the present embodiment includes a tripping device configured to quickly open the contacts 311 and 312 when an abnormal current flows through the electric paths 511 and 512 and also functions as a circuit breaker. The tripping device is configured to operate to quickly open the contacts 311 and 312, when a period in which over-current flows through the contacts 311 and 312 reaches a predetermined period or when a short-circuit current flows into a circuit that includes the contacts 311 and 312.

The processing module 33 includes a first detector 331 configured to detect whether the switching device 31 is in the open state or the closed state and a second detector 332 configured to detect whether the switching mechanism 32 has applied external force that allows the switching device 31 to enter the open state. Moreover, the processing module 33 includes a determining module 330 configured to determine whether a malfunction has occurred based on the detection results obtained by the first and second detectors 331 and 332. Although the processing module 33 is preferably provided in the connector 30, the processing module 33 may be provided separately from the connector 30. Moreover, the determining module 330 may be provided in the connector 30 and the first and second detectors 331 and 332 may be provided separately from the connector 30.

Here, since the processing module 33 needs to express the two states of abnormal and normal, the determining module 330 may output a binary determination signal as the determination result. Preferably, the connector 30 further includes a notification module 34 in order to transmit the determination signal output from the processing module 33 to the power conversion device 10. The configuration and operation of the processing module 33 and the notification module 34 will be described later.

In order for the first detector 331 to detect whether the contacts 311 and 312 which are the main contacts of the switching device 31 are in the closed state or the open state, the switching device 31 preferably includes an auxiliary contact 313 that is in synchronization with opening and closing of the contacts 311 and 312. The auxiliary contact 313 includes a common contact, a first contact, and a second contact, and the common contact is configured to be selectively connected to one of the first and second contacts.

When the two contacts 311 and 312 of the switching device 31 are in the open state, the common contact is electrically connected to the first contact. When any one of the contacts 311 and 312 of the switching device 31 is in the closed state, the common contact is electrically connected to the second contact. That is, the auxiliary contact 313 is connected to the contacts 311 and 312 which are the main contacts, and the common contact is electrically connected to one of the first and second contacts by being synchronized with the movement of the contacts 311 and 312. Thus, for example, even when external force that allows a contact to enter the open state is applied to the operator, if any one of the two contacts 311 and 312 is welded, the common contact of the auxiliary contact 313 is maintained in a state of being electrically connected to the second contact.

The auxiliary contact 313 is connected to the first detector 331, and the first detector 331 detects an open/closed state of the contacts 311 and 312 which are the main contacts by monitoring whether the common contact of the auxiliary contact 313 is electrically connected to the first contact or the second contact.

Further, the switching device 31 includes an actuator 314 configured to open or close the contacts 311 and 312 separately from the operator. The actuator 314 includes a non-polar electromagnet and applies force to the contacts 311 and 312 so that the contacts 311 and 312 are closed during conduction and the contacts 311 and 312 are opened during non-conduction. The actuator 314 is provided in order to open the contacts 311 and 312 when the temperature of the insertion portion 304 exceeds a predetermined allowable temperature.

Thus, the connector 30 includes a temperature sensor 37 configured to monitor the temperature of the insertion portion 304 and a driver 38 configured to operate the actuator 314 based on the output of the temperature sensor 37. For example, the temperature sensor 37 is a thermistor. When the connector 30 is attached to the connecting port 42, and the temperature detected by the temperature sensor 37 exceeds the allowable temperature, the driver 38 stops conduction of the actuator 314 to allow the switching device 31 to enter the open state.

When the connector 30 is not attached to the connecting port 42, the switching device 31 enters the open state with the aid of the switching mechanism 32. Moreover, when the connector 30 is attached to the connecting port 42, the switching device 31 enters the open state if the release button 323 is operated, an abnormal current flows through the electric path 511 and 512, or the temperature of the insertion portion 304 exceeds the allowable temperature.

Further, the connector 30 includes a control power supply 39 configured to supply electric power to the processing module 33, the notification module 34, and the like using control electric power (for example, DC 12 V) supplied through the signal line 23 from a control power supply 14 (see FIG. 3) provided in the power conversion device 10.

Figure 3:
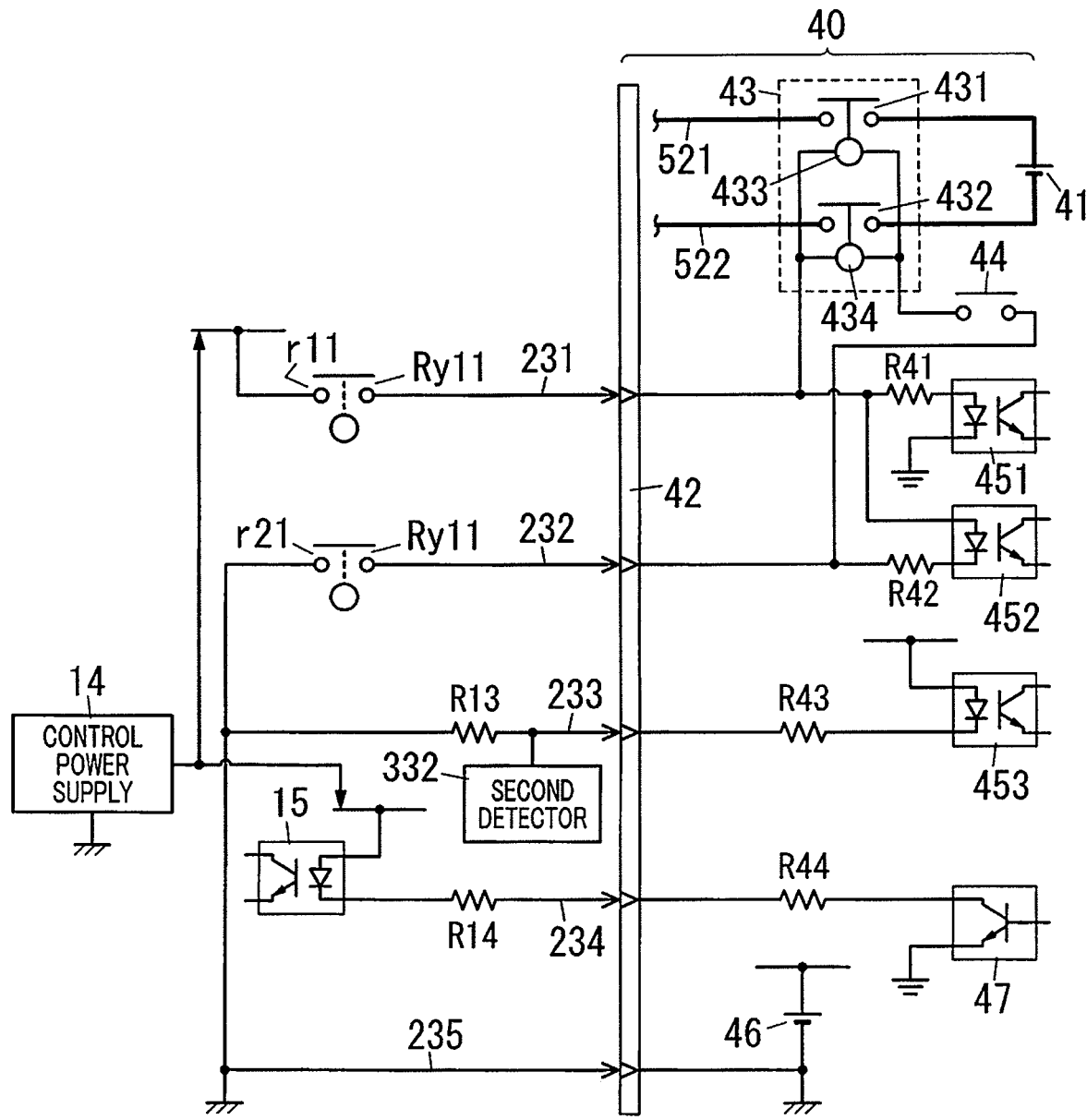
FIG. 3 is a portion of a circuit diagram used in Embodiment 1.

In the present embodiment, as illustrated in FIG. 3, the power conversion system that includes the power conversion device 10 and the connector 30 receives and transmits information with respect to the electric vehicle 40 through five control lines 231 to 235 included in the signal line 23. In FIG. 3, the control lines 231 to 235 are meant to include an electric path connected to the control lines 231 to 235 of the cable 20 in the power conversion device 10 and the connector 30 rather than only the electric path of the cable 20.

In the illustrated example, a case in which the connector 30 is attached to the connecting port 42 is illustrated. Moreover, in FIG. 3, the electric paths 511 and 512 and a communication line for performing the CAN communication are not illustrated. In the illustrated example, although the power conversion device 10 and the connector 30 are not distinguished, a configuration excluding the second detector 332 and the insertion portion 304 is preferably provided in the power conversion device 10.

In the control line 231, a contact r11 of an electromagnetic relay Ry11 is connected between the positive electrode of the control power supply 14 and the insertion portion 304. Moreover, in the control line 232, a contact r12 of an electromagnetic relay Ry12 is connected between a ground (a negative electrode) of the control power supply 14 and the insertion portion 304. Further, in the control line 233, a resistor R13 is connected between the ground of the control power supply 14 and a contactor of the connector 30. In the control line 234, a series circuit of a primary side of a photocoupler 15 and a resistor R14 is connected between a positive electrode of the control power supply 14 and a contactor of the connector 30. In the illustrated example, the second detector 332 is provided so as to monitor the potential between the contactor and the resistor R13 in the control line 233.

The electric vehicle 40 includes an on-vehicle battery 46 which is a power supply for operating apparatuses mounted in the electric vehicle 40 separately from the storage battery 41 which is the travelling energy source. That is, the electric vehicle 40 includes the storage battery 41 which is a first battery and the on-vehicle battery 46 which is a second battery. A terminal voltage of the on-vehicle battery 46 is DC 12 V, for example. The control power supply 14 and the on-vehicle battery 46 are connected together through the control line 235 so that the ground potentials thereof are equal. The on-vehicle battery 46 is mounted in order to operate facilities of the vehicle such as an air-conditioner, wipers, head lights, turn signal lights, an interior light, or a car navigation. That is, the on-vehicle battery 46 is typically a lead-acid storage battery.

The electric vehicle 40 includes three photocouplers 451, 452, and 453. A primary side of the photocoupler 451 is connected to the control line 231 via a resistor R41, and a primary side of the photocoupler 452 is connected to the control line 232 via a resistor R42. Moreover, a primary side of the photocoupler 453 is connected to the control line 233 via a resistor R43. The electric vehicle 40 includes a transistor 47 and the control line 234 is connected to the transistor 47 via a resistor R44.

In the electric vehicle 40, the switching device 43 has coils 433 and 434 that form an electromagnet and are connected in parallel, and a switching device 44 is connected in series to a parallel circuit of the coils 433 and 434. A coil that serves as the coils 433 and 434 may be provided. The switching device 44 may be an electromagnetic relay, a photocoupler, or the like.

A series circuit of the coils 433 and 434 and the switching device 44 is connected between the control lines 231 and 232 when the connector 30 is attached to the connecting port 42. In this configuration, when the switching device 44 enters the ON state in a state in which the contact r11 of the electromagnetic relay Ry11 is closed and the contact r12 of the electromagnetic relay Ry12 is closed, the coils 433 and 434 are made conductive and the contacts 431 and 432 of the switching device 43 are closed.

The primary side of the photocoupler 451 is connected between the control line 231 and the ground, and the primary side of the photocoupler 452 is connected between the control line 231 and the control line 232. Thus, when the contact r11 of the electromagnetic relay Ry11 is closed, a secondary side of the photocoupler 451 enters an ON state. In this case, when the contact r12 of the electromagnetic relay Ry12 is open, a secondary side of the photocoupler 452 is maintained in an OFF state. On the other hand, when both the contact r11 of the electromagnetic relay Ry11 and the contact r12 of the electromagnetic relay Ry12 are closed, the secondary side of the photocoupler 452 as well as the photocoupler 451 enters the ON state.

The primary side of the photocoupler 453 is connected between the control line 233 and a positive electrode of the on-vehicle battery 46. Thus, when the connector 30 is attached to the connecting port 42, the second detector 332 detects a voltage which is a terminal voltage of the on-vehicle battery 46 divided by the resistors R13 and R44.

In the abovementioned configuration, since the transistor 47 is connected to a primary side of the photocoupler 15 via the control line 234, the ON/OFF state of the transistor 47 is transmitted to a secondary side of the photocoupler 15. Thus, it is possible to transmit information from the electric vehicle 40 to the power conversion device 10.

An operation of charging the storage battery 41 will be described briefly. When the connector 30 is attached to the connecting port 42 of the electric vehicle 40, the photocoupler 453 enters the ON state since current flows through the control line 233. Thus, the electronic control unit 45 of the electric vehicle 40 recognizes that the connector 30 is connected to the connecting port 42. Moreover, the second detector 332 recognizes that the connector 30 is attached to the connecting port 42 by detecting the terminal voltage of the on-vehicle battery 46 divided by the resistors R13 and R44.

After that, when an operation for instructing the power conversion device 10 to start charging is performed, the power conversion device 10 starts performing a process for performing charging and turns the contact r11 of the electromagnetic relay Ry11 on. The power conversion device 10 includes an operator (not illustrated) and the operation of starting charging is performed on the operator.

When the contact r11 of the electromagnetic relay Ry11 enters an ON state, the photocoupler 451 enters the ON state since current flows through the control line 231. When the photocoupler 451 enters the ON state, the electronic control unit 45 of the electric vehicle 40 recognizes that the power conversion device 10 is operated and starts CAN communication with the power conversion device 10. Thus, the power conversion device 10 receives, from the electronic control unit 45, information on the state of the storage battery 41 such as the remaining capacity of the storage battery 41, the temperature of the storage battery 41, and the like.

Subsequently, the electronic control unit 45 of the electric vehicle 40 turns the transistor 47 on in order to allow transmission of electric power between the power conversion device 10 and the storage battery 41. When the transistor 47 enters the ON state, the photocoupler 15 connected to the transistor 47 through the control line 234 enters the ON state. When the photocoupler 15 enters the ON state, the power conversion device 10 recognizes that transmission of electric power with respect to the storage battery 41 is allowed and supplies electric power to the actuator 321 provided in the switching mechanism 32 of the connector 30 to inhibit movement of the release button 323. That is, the switching mechanism 32 enters a lock state. After that, the power conversion device 10 turns the contact r12 of the electromagnetic relay Ry12 on. When the contact r12 of the electromagnetic relay Ry12 enters the ON state, the photocoupler 452 enters the ON state through the contact r11 of the electromagnetic relay Ry11 and the contact r12 of the electromagnetic relay Ry12. With the photocoupler 452, the electronic control unit 45 of the electric vehicle 40 recognizes that transmission of electric power with respect to the power conversion device 10 is allowed.

Upon recognizing that transmission of electric power between the power conversion device 10 and the storage battery 41 is allowed, the electronic control unit 45 of the electric vehicle 40 turns the switching device 44 on and closes the contacts 431 and 432 of the switching device 43. Moreover, the electronic control unit 45 performs CAN communication with the power conversion device 10 to send an instruction on a current value required for charging the storage battery 41 to the power conversion device 10. Upon receiving the instruction on the current value required for the charging, the power conversion device 10 starts supplying electric power to the electric paths 511 and 512 in order to charge the storage battery 41.

Although there is more than one kind of condition for ending the charging of the storage battery 41, a case in which charging ends based on the remaining capacity of the storage battery 41 of the electric vehicle 40 will be described as an example. In this case, the electronic control unit 45 of the electric vehicle 40 turns the transistor 47 off when the remaining capacity of the storage battery 41 reaches a predetermined value. When the transistor 47 enters the OFF state, since the photocoupler 15 enters the OFF state, the power conversion device 10 recognizes that it is instructed to end the charging and stops supplying electric power to the electric paths 511 and 512. On the other hand, when it is checked that the current for charging the storage battery 41 has decreased to a predetermined value or lower, the electronic control unit 45 of the electric vehicle 40 turns the switching device 44 off and opens the contacts 431 and 432 of the switching device 43. After that, the power conversion device 10 and the electronic control unit 45 perform a checking process including insulation diagnosis. When the checking ends, the power conversion device 10 stops supplying electric power to the actuator 321 provided in the switching mechanism 32 of the connector 30 to allow the connector 30 to be separated from the connecting port 42 and ends the charging process. That is, the switching mechanism 32 enters the unlock state.

Next, an operation of allowing the electric power stored in the storage battery 41 to be output to the power conversion device 10 will be described briefly. That is, in the following description, an operation of the storage battery 41 discharging electric power to the power conversion device 10 will be explained. The process until it is recognized that the power conversion device 10 and the electronic control unit 45 of the electric vehicle 40 can transmit electric power between the power conversion device 10 and the storage battery 41 is the same as the process of charging the storage battery 41.

That is, when the connector 30 is attached to the connecting port 42 of the electric vehicle 40, the photocoupler 453 enters the ON state and the electronic control unit 45 recognizes that the connector 30 is connected to the connecting port 42. Moreover, when the second detector 332 detects the voltage of the control line 233, the electronic control unit recognizes that the connector 30 is in the attached state relative to the connecting port 42.

After that, when an operation for using the electric power discharged from the storage battery 41 is performed on the operator of the power conversion device 10, the power conversion device 10 starts a discharging process. When the discharging process starts, the power conversion device 10 turns the contact r11 of the electromagnetic relay Ry11 on to allow the electronic control unit 45 of the electric vehicle 40 to recognize that the power conversion device 10 has been operated. The electronic control unit 45 starts performing CAN communication with the power conversion device 10 and information on the state of the storage battery 41 such as the remaining capacity of the storage battery 41, the temperature of the storage battery 41, and the like is transmitted from the electronic control unit 45 to the power conversion device 10.

Further, the electronic control unit 45 turns the transistor 47 on to notify the power conversion device 10 that discharging is allowed. With this operation, the power conversion device 10 inhibits movement of the release button 323 by supplying electric power to the actuator 321 provided in the switching mechanism 32 of the connector 30. That is, the movement of the latch lever 322 is inhibited and the lock state is maintained. After that, the power conversion device 10 turns the contact r12 of the electromagnetic relay Ry12 on to allow the electronic control unit 45 of the electric vehicle 40 to recognize that transmission of electric power with respect to the storage battery 41 is allowed.

Upon recognizing that transmission of electric power between the power conversion device 10 and the storage battery 41 is allowed, the electronic control unit 45 of the electric vehicle 40 turns the switching device 44 on and closes the contacts 431 and 432 of the switching device 43. Moreover, the electronic control unit 45 performs CAN communication with the power conversion device 10 to allow the power conversion device 10 to start operating to convert the DC electric power of the storage battery 41 into AC electric power.

Although there is more than one kind of condition for ending the discharging of the storage battery 41, a case in which discharging ends based on the remaining capacity of the storage battery 41 of the electric vehicle 40 will be described as an example. In this case, when the remaining capacity of the storage battery 41 reaches a predetermined value, the electronic control unit 45 of the electric vehicle 40 turns the transistor 47 off to allow the power conversion device 10 to recognize the end of discharging. When the power conversion device 10 stops operating and when the electronic control unit 45 checks that the current for discharging the electric power from the storage battery 41 to the power conversion device 10 has decreased to a predetermined value or lower, then the electronic control unit 45 turns the switching device 44 off and opens the contacts 431 and 432 of the switching device 43. After that, when the power conversion device 10 and the electronic control unit 45 perform a checking process and the checking ends, the power conversion device stops supplying electric power to the actuator 321 provided in the switching mechanism 32 of the connector 30 to allow the connector 30 to be separated from the connecting port 42 and ends the discharging process.

As described above, the connector 30 of the present embodiment includes the processing module 33 as a configuration for detecting a malfunction in the switching device 31 and the processing module 33 includes the determining module 330, the first detector 331, and the second detector 332. Moreover, a result of determination by the determining module 330 is sent to the power conversion device 10 through the notification module 34.

As described above, the first detector 331 detects whether the switching device 31 is in the open state or the closed state depending on whether the common contact of the auxiliary contact 313 opened and closed by being synchronized with the contacts 311 and 312 of the switching device 31 is electrically connected to the first contact or the second contact. For example, the first detector 331 is configured to output an L-level detection signal when the switching device 31 is in the open state and the common contact of the auxiliary contact 313 is electrically connected to the first contact. Moreover, the first detector 331 outputs an H-level detection signal when the switching device 31 is in the closed state and the common contact of the auxiliary contact 313 is electrically connected to the second contact. The L and H levels are optional values indicating that the detection signal has two values. For example, the L level corresponds to a voltage value of 0 V and the H level corresponds to a voltage value of 12 V. In other words, when the voltage value output from the first detector 331 is 0 V, it is determined that the switching device 31 is in the open state. When the voltage value output from the first detector 331 is 12 V, it is determined that the switching device 31 is in the closed state.

As described above, the second detector 332 monitors the voltage value of the control line 233. By monitoring the voltage value of the control line 233, it is possible to identify whether the body 301 of the connector 30 is in the attached state or the unattached state relative to the connecting port 42. That is, when the body 301 of the connector 30 is in the attached state relative to the connecting port 42, since current flows through the control line 233 into a series circuit of the resistors R13 and R44, the second detector 332 recognizes that the body 301 is attached to the connecting port 42.

For example, when the body 301 of the connector 30 is in the unattached state relative to the connecting port 42, the voltage value of the control line 233 detected by the second detector 332 is 0 V. In contrast, when the body 301 of the connector 30 is in the attached state relative to the connecting port 42, the voltage value of the control line 233 detected by the second detector 332 is larger than 0 V. The voltage value of the control line 233 when the body 301 of the connector 30 is in the attached state relative to the connecting port 42 is set to 2 V, for example, although the voltage value depends on a combination of the resistance values of the resistors R13 and R44.

The second detector 332 can determine whether the body 301 of the connector 30 is in the attached state or the unattached state relative to the connecting port 42 by monitoring the voltage value of the control line 233 and comparing the monitored voltage value with a predetermined threshold. As described above, the threshold may be set to 1 V, for example, as long as the voltage value of the control line 233 in the attached state is 2 V. For example, the second detector 332 outputs an H-level detection signal when the body 301 is in the attached state and the monitored voltage value is larger than the threshold, and outputs an L-level detection signal when the body 301 is in the unattached state and the monitored voltage value is equal to or lower than the threshold.

The determining module 330 determines whether a malfunction has occurred in the switching device 31 by combining the detection signal output from the first detector 331 and the detection signal output from the second detector 332. In this example, as illustrated in Table 1, the determining module 330 is configured to determine that a malfunction has occurred when the detection signal of the first detector 331 has an H level and the detection signal of the second detector 332 is at an L level.

TABLE 1

|  |  | State | |
| --- | --- | --- | --- |
|  |  | Attached state | Unattached state |
| Switching device | Open | Normal | Malfunction |
|  | Closed | Normal | Normal |

The switching device 31 provided in the connector 30 always enters the open state when the body 301 of the connector 30 is in the unattached state relative to the connecting port 42 if the contacts 311 and 312 which are the main contacts are normal. Thus, the determining module 330 determines that a malfunction such as weld has occurred in the contacts 311 and 312 when the body 301 is in the unattached state relative to the connecting port 42 and the contacts 311 and 312 which are the main contacts are in the closed state. In other words, the determining module 330 determines that a malfunction has occurred in the switching device 31 when the detection signal of the first detector 331 has an H level and the detection signal of the second detector 332 has an L level. When the detection signals have another combination, the determining module 330 determines that the switching device 31 is normal.

In the configuration, the second detector 332 identifies whether the body 301 of the connector 30 is in the attached state or the unattached state relative to the connecting port 42 by monitoring the voltage value of the control line 233. That is, it is determined that a malfunction has occurred when the switching device 31 is in the closed state and the body 301 is in the unattached state relative to the connecting port 42.

However, practically, even when the release button 323 is operated and external force for putting the switching device 31 into the open state is applied to the operator of the switching device 31, it is not normal if the switching device 31 is in the closed state. Thus, in order to detect a malfunction at an early stage, the second detector 332 preferably detects that the switching device 31 is in the closed state after the release button 323 in the attached state is operated. That is, the second detector 332 is preferably configured to detect that the release button 323 is operated as well as identifying the attached state and the unattached state. Thus, the connector 30 may include a switch (not illustrated), for example, in order to detect an operation of the release button 323 and may send an ON/OFF state of the switch to the second detector 332.

The determining module 330 may start determining the presence or absence of a malfunction in the switching device 31 in response to an event that the first detector 331 detects the closed state of the switching device 31 (that is, the detection signal of the first detector 331 has an H level) as a trigger. Moreover, the determining module 330 ends determining the presence or absence of a malfunction in the switching device 31 in response to an event that the first detector 331 detects the open state of the switching device 31 (that is, the detection signal of the first detector 331 has an L level) as a trigger.

Since the result of determination by the processing module 33 is either normal or abnormal, the notification module 34 transmits a binary signal of a first value indicating a malfunction and a second value indicating non-presence or absence of a malfunction to the power conversion device 10. The notification module 34 is connected to the signal line 23 of the cable 20 and transmits the binary signal to the power conversion device 10 through the signal line 23.

The power conversion device 10 receives the binary signal transmitted from the notification module 34 as the result of determination by the processing module 33 with the aid of the communicator 12. When the signal received by the communicator 12 indicates that a malfunction has occurred in the switching device 31 of the connector 30, the power conversion device 10 allows the alarm 13 to send an alarm indicating a malfunction. The alarm 13 includes a display that displays a message, for example, and displays a message indicating that a malfunction has occurred in the switching device 31 when a malfunction in the switching device 31 is notified to the communicator 12. Here, the connector 30 may include a display lamp (not illustrated) for displaying the result of determination by the determining module 330.

As described above, the power conversion system of the present embodiment includes the processing module 33 in addition to the power conversion device 10 and the connector 30. The power conversion device 10 is connected to the power system (the distribution board 60). The attached state and the unattached state of the connector 30 relative to the connecting port 42 provided in an apparatus (the electric vehicle 40) having a battery (the storage battery 41) mounted therein can be selected. The processing module 33 is configured to determine that a malfunction has occurred when a voltage is applied to a portion that electrically connects the connector 30 and the connecting port 42 in a period in which transmission of electric power with respect to a battery (the storage battery 41) is stopped.

Thus, according to this configuration, the processing module 33 can detect a malfunction. Here, the period in which transmission of electric power with respect to the battery (the storage battery 41) is stopped corresponds to a period excluding a charging period or a discharging period, and the portion that electrically connects the connector 30 and the connecting port 42 corresponds to the contactors 361 and 362 or the contactors 421 and 422. Thus, the processing module 33 determines that a malfunction has occurred when a voltage of the power conversion device 10 or the battery (the storage battery 41) is applied to the contactors 361 and 362 or the contactors 421 and 422 in the period excluding the charging or discharging period. That is, the processing module 33 can determine that a malfunction has occurred when a voltage is applied to the contactors 361 and 362 or the contactors 421 and 422 although charging or discharging is not performed, and can take countermeasures quickly.

Moreover, in the configuration example, the power conversion system includes the switching device 31 and the switching mechanism 32 which are provided in the connector 30. The switching device 31 is intervened in the electric paths 511 and 512 between the power conversion device 10 and the battery (the storage battery 41) in the connector 30, and a closed state in which the electric paths 511 and 512 are made conductive and an open state in which the electric paths 511 and 512 are made non-conductive are selected. The switching mechanism 32 is configured to allow the switching device 31 to enter the closed state when the connector 30 is in the attached state and to allow the switching device to enter the open state when the connector 30 is in the unattached state.

In this configuration, the processing module 33 includes the first detector 331, the second detector 332, and the determining module 330. The first detector 331 detects the open state and the closed state of the switching device 31. The second detector 332 detects the attached state and the unattached state of the connector 30. The determining module 330 determines that a malfunction has occurred when the first detector 331 detects the closed state and the second detector 332 detects the unattached state. Thus, for example, in a state in which the connector 30 is attached, even when an abnormal current flows through the electric paths 511 and 512 and the switching device 31 enters the open state, the processing module 33 can accurately determine the presence or absence of a malfunction rather than erroneously determining that a malfunction has occurred in the switching device 31.

Further, in the present embodiment, the first detector 331 and the second detector 332 are provided in the connector 30. With this configuration, in the power conversion system, the connector 30 can detect both the open/closed state of the switching device 31 provided in the connector 30 and the attached state of the connector 30 relative to the connecting port 42. That is, it is possible to change the design of the power conversion device 10 as little as possible.

In the present embodiment, the processing module 33 is provided in the connector 30 and the connector 30 includes the notification module 34 configured to notify the power conversion device 10 of the binary signal indicating the result of determination by the processing module 33. That is, in the power conversion system, the connector 30 determines the presence or absence of a malfunction in the switching device 31, and the notification module 34 transmits the binary signal indicating the determination result from the connector 30 to the power conversion device 10. Thus, the power conversion system can suppress an increase in the amount of data transmitted to the power conversion device 10 and can reduce the influence of noise as compared to a case in which the detection results by the first and second detectors 331 and 332 are transmitted from the connector 30 to the power conversion device 10.

Further, in the present embodiment, the switching device 31 includes a main contact (the contacts 311 and 312) that opens or closes the electric paths 511 and 512 and the auxiliary contact 313 that is opened or closed by being synchronized with the main contact (the contacts 311 and 312). The first detector 331 detects whether the switching device 31 is in the open state or the closed state by monitoring the contact state of the auxiliary contact 313. Thus, the first detector 331 can detect the open/closed state of the switching device 31 with a simple process of monitoring the output of the auxiliary contact 313.

In the configuration example, although the connector 30 includes the processing module 33 for detecting a malfunction in the switching device 31, the connector 30 may include the first detector 331 and the second detector 332 and the power conversion device 10 may include the determining module 330. In this case, the notification module 34 transmits the result of detection by the first and second detectors 331 and 332 to the power conversion device 10, and the determining module 330 determines a malfunction in the switching device 31 based on the information received from the notification module 34.

Moreover, the connector 30 may include the first detector 331 and the notification module 34, and the power conversion device 10 may include the determining module 330 and the second detector 332. In this case, the notification module 34 transmits the result of detection by the first detector 331 to the power conversion device 10. The determining module 330 determines the presence or absence of a malfunction in the contacts 311 and 312 of the switching device 31 based on the result of detection by the first detector 331 transmitted from the notification module 34 and the result of detection the second detector 332.

Further, the processing module 33 that monitors a malfunction in the switching device 31 provided in the connector 30 may be provided in the power conversion device 10. In this case, the notification module 34 and the communicator 12 may be omitted.

As described above, the connector 30 may include a display lamp for displaying that the processing module 33 has detected a malfunction in the switching device 31. In this case, the configuration in which the result of determination by the determining module 330 is notified to the power conversion device 10 may be omitted. That is, the notification module 34 may be omitted.

Although the actuator 321 of the switching mechanism 32 inhibits an operation on the release button 323 in the lock state and allows an operation on the release button 323 in the unlock state, the movement of the latch lever 322 may be inhibited or allowed.

Embodiment 2

In Embodiment 1, a first detector 331 uses an auxiliary contact 313 provided in a switching device 31 separately from contacts 311 and 312 which are main contacts in order to detect an open state and a closed state of the switching device 31. In contrast, in the present embodiment, a configuration example in which the first detector 331 detects the open state and the closed state of the switching device 31 without the auxiliary contact 313. Hereinafter, the same constituent elements as those of Embodiment 1 will be denoted by the same reference numerals, and the description thereof will not be provided.

In the present embodiment, the first detector 331 identifies the open state and the closed state of the switching device 31 by monitoring a voltage value between measurement points P1 and P2 set in electric paths 511 and 512 of a connector 30 and comparing the voltage value with a predetermined threshold. As illustrated in FIG. 1, the measurement points P1 and P2 are set in the electric paths 511 and 512 between the switching device 31 and contactors 361 and 362.

In this configuration, the first detector 331 is configured to detect whether the switching device 31 is in the open state or the closed state at a time point at which a state of a body 301 of the connector 30 relative to a connecting port 42 changes from an attached state to an unattached state. Specifically, the first detector 331 instructs a power conversion device 10 to supply a small current to the electric paths 511 and 512 in response to an event in which the output of a second detector 332 changes from H level to L level as a trigger, and detects whether the switching device 31 is in the closed state or the open state based on the small current.

The first detector 331 detects whether the switching device 31 is in the closed state or the open state at a time point at which a predetermined period elapses after the output of the second detector 332 changes to L level rather than detecting the open/closed state of the switching device 31 immediately after the output of the second detector 332 changes to L level. Moreover, the power conversion device 10 preferably supplies a small current continuously for a predetermined period around the time point at which the first detector 331 detects whether the switching device 31 is in the closed state or the open state. This is to reduce the influence of a variation in the small current. The period until the first detector 331 detects whether the switching device 31 is in the closed state or the open state after the output of the second detector 332 changes to L level is preferably approximately several seconds.

As described above, when the output of the second detector 332 changes to L level, in a state in which a small current flows from the power conversion device 10 to the electric paths 511 and 512, the first detector 331 measures a voltage value between the measurement points P1 and P2 set between the switching device 31 and an insertion portion 304. The first detector 331 compares the voltage value between the electric paths 511 and 512 with a threshold.

If the contacts 311 and 312 intervened in the two electric paths 511 and 512 are open, since the voltage value between the two measurement points P1 and P2 is equal to or lower than a threshold, the output of the first detector 331 changes to L level. On the other hand, if the voltage value between the measurement points P1 and P2 set in the two electric paths 511 and 512 is higher than a threshold, since it indicates that the contacts 311 and 312 intervened in the electric paths 511 and 512 are closed, the output of the first detector 331 changes to H level. That is, the output of the first detector 331 changes to L level when the switching device 31 is in the open state, and the output of the first detector 331 changes to H level when the switching device 31 is in the closed state. As a result, similarly to Embodiment 1, it is possible to determine a malfunction in the switching device 31 based on a combination of the outputs of the first and second detectors 331 and 321.

According to the configuration of the present embodiment, the first detector 331 measures the voltage value between the measurement points P1 and P2 set in the electric paths 511 and 512 between the switching device 31 and the contactors 361 and 362. Thus, the switching device 31 of the connector 30 does not require the auxiliary contact 313, and the first detector 331 can detect the open/closed state of the switching device 31 even when the switching device 31 in which the auxiliary contact 313 is not provided in the connector 30 is used. Thus, a processing module 33 determines that a malfunction has occurred in the switching device 31 when the closed state of the switching device 31 is detected by the first detector 331 and the unattached state of the connector 30 is detected by the second detector 332.

The other configuration and function are the same as the configuration and function of Embodiment 1. Moreover, the configuration described in the present embodiment can be combined with various configuration examples described in Embodiment 1.

In the embodiment, the second detector 332 detects whether the body 301 of the connector 30 is in the attached state or the unattached state relative to the connecting port 42 based on the voltage value of the control line 233. However, another configuration may be employed to detect whether the body 301 of the connector 30 is in the attached state or the unattached state relative to the connecting port 42.

For example, a small switch such as a micro-switch may be provided in a portion in which the body 301 of the connector 30 is inserted into and removed from the connecting port 42. In this configuration, the small switch may be disposed so that the small switch is turned on and off by being synchronized with insertion and removal of the body 301 relative to the connecting port 42. In this configuration, the second detector 332 detects whether the connector 30 is connected to the connecting port 42 based on an ON/OFF state of a contact of the small switch.

Embodiment 3

Figure 4:
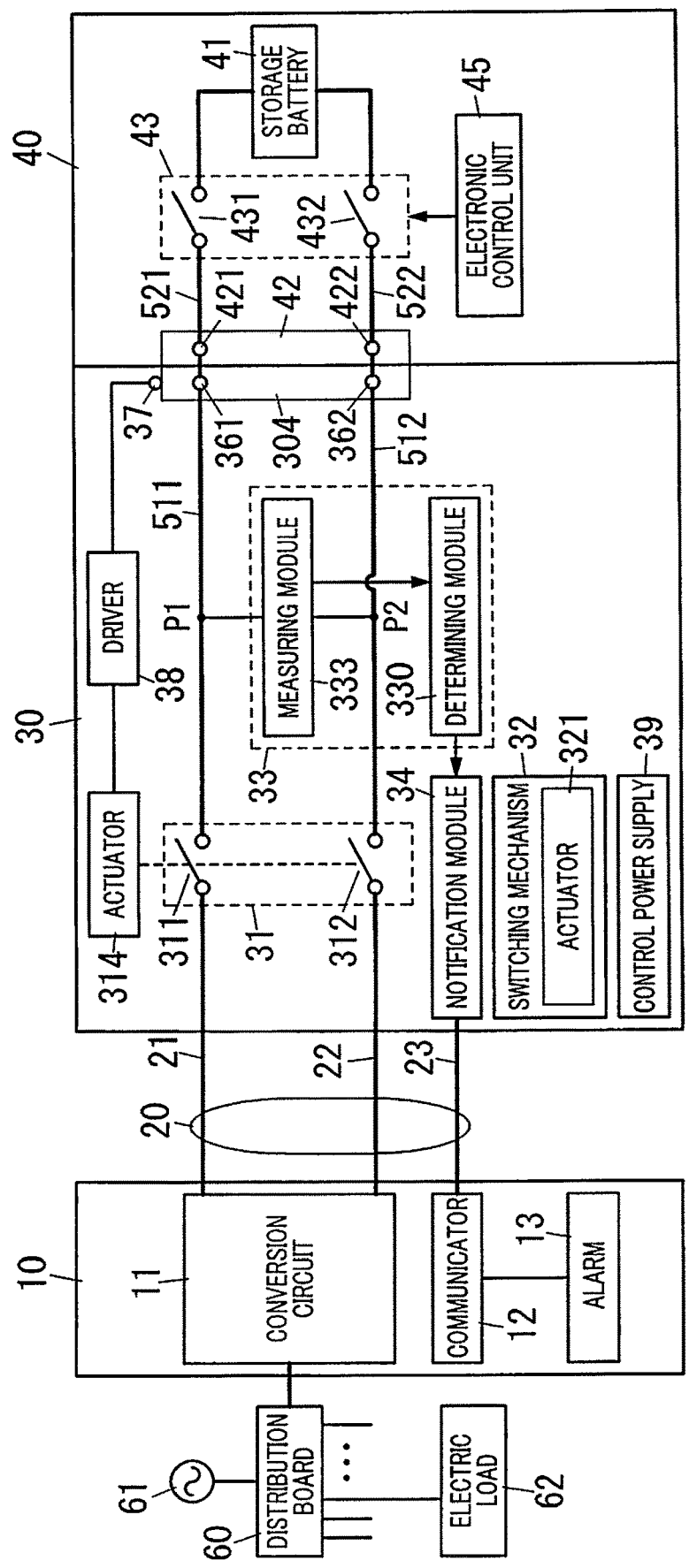
FIG. 4 is a block diagram illustrating Embodiment 3.

In the configuration of the present embodiment illustrated in FIG. 4, a processing module 33 provided in a connector 30 is configured to detect a malfunction in a switching device 43 provided in an electric vehicle 40 rather than detecting only a malfunction in a switching device 31 included in the connector 30. The processing module 33 is configured to monitor a voltage value between measurement points P1 and P2 set in two electric paths 511 and 512 between the switching device 31 and an insertion portion 304 and detect a malfunction in the switching devices 31 and 43 based on the voltage value.

In Embodiment 2, the voltage value between the measurement points P1 and P2 is measured in a state in which a small current flows into the electric paths 511 and 512 at a time point at which the state of the body 301 of the connector 30 changes from the attached state to the unattached state. In contrast, the processing module 33 of the present embodiment is configured to detect a malfunction in the switching devices 31 and 43 by monitoring a voltage value between the measurement points P1 and P2 with the aid of a measuring module 333 without supplying a small current separately.

In the configuration of the present embodiment described below, the same constituent elements as those of Embodiment 1 will be denoted by the same reference numerals and the description thereof will not be provided. The processing module 33 of the present embodiment includes the measuring module 333 and a determining module 330 configured to detect presence or absence of a malfunction in the switching devices 31 and 43 based on a result of measurement by the measuring module 333. A configuration of sending the result of determination by the determining module 330 from a notification module 34 to the power conversion device 10 is the same as that of Embodiment 1.

The measuring module 333 measures the voltage value between the electric paths 511 and 512 in an open state of the switching device 43 provided in the electric vehicle 40. The determining module 330 compares the voltage value measured by the measuring module 333 with a predetermined threshold and determines that a malfunction has occurred in the switching device 43 when the voltage value exceeds the threshold. Moreover, the determining module 330 outputs a binary signal indicating the determination result on whether the switching device 43 is normal or abnormal. The binary signal is sent to the power conversion device 10 through the notification module 34.

When the switching device 31 provided in the connector 30 is in the open state or the power conversion device 10 is not outputting electric power, a storage battery 41 is the only power supply that generates a voltage between the electric paths 511 and 512. Thus, in this state, it is possible to determine whether the switching device 43 provided in the electric vehicle 40 is in the open state or the closed state based on a voltage value between the measurement points P1 and P2. On the other hand, when the switching device 43 provided in the electric vehicle 40 is in the open state and the power conversion device 10 is outputting electric power, it is possible to determine whether the switching device 31 provided in the connector 30 is in the open state or the closed state based on the voltage value between the measurement points P1 and P2.

Here, since the measurement points P1 and P2 are set between the switching device 31 and the switching device 43, when it is determined whether the switching device 43 is in the open state or the closed state, the switching device 31 needs to be in the open state or the power conversion device 10 needs to be outputting no electric power as described above. Conversely, even when the switching device 31 enters the open state such as when the temperature of the insertion portion 304 of the switching device 31 has increased abnormally or when an abnormal current flows through the switching device 31, it is possible to detect whether the switching device 43 is in the open state or the closed state based on the result of measurement by the measuring module 333.

For example, an event in which contacts 431 and 432 of the switching device 43 do not enter an open state due to weld even when an electronic control unit 45 of the electric vehicle 40 has performed control of putting the switching device 43 into the open state needs to be detected as a malfunction in the switching device 43. When such an event occurs, since a voltage of the storage battery 41 is applied to the measurement points P1 and P2 of the electric paths 511 and 512, an output of the determining module 330 changes to H level.

The electronic control unit 45 of the electric vehicle 40 notifies the power conversion device 10 according to CAN communication of the fact that control of putting the switching device 43 into the open state has been performed. Thus, the power conversion device 10 can recognize a malfunction in the switching device 43 by combining the output of the determining module 330 received through the notification module 34 and the content of the control of the electronic control unit 45 received through CAN communication.

The processing module 33 may determine whether a malfunction has occurred in the switching device 43 by acquiring the content of the control of the electronic control unit 45 and combining the same with the result of measurement by the measuring module 333. The processing module 33 may not need to directly acquire the content of the control of the electronic control unit 45 but the processing module 33 may be configured to receive from the power conversion device 10 the content notified to the power conversion device 10 through CAN communication by the electronic control unit 45. Alternatively, the power conversion device 10 may determine that the switching device 43 has entered the open state upon receiving an instruction to end charging or discharging from the electronic control unit 45 of the electric vehicle 40. That is, the electronic control unit 45 does not need to notify the power conversion device 10 of the fact that the switching device 43 has entered the open state, but the electronic control unit 45 may be notified of the end of charging or discharging in the process of charging or discharging the storage battery 41.

The processing module 33 measures the voltage value between the measurement points P1 and P2 with the aid of the measuring module 333 when the switching device 43 is controlled to enter the open state. The determining module 330 determines that there is no malfunction in the switching device 43 when the voltage value measured by the measuring module 333 is equal to or lower than a threshold and determines that a malfunction has occurred in the switching device 43 when the voltage value measured by the measuring module 333 exceeds the threshold. Further, the determining module 330 outputs a binary signal indicating the presence or absence of a malfunction and sends the binary signal to the power conversion device 10.

Figure 5:
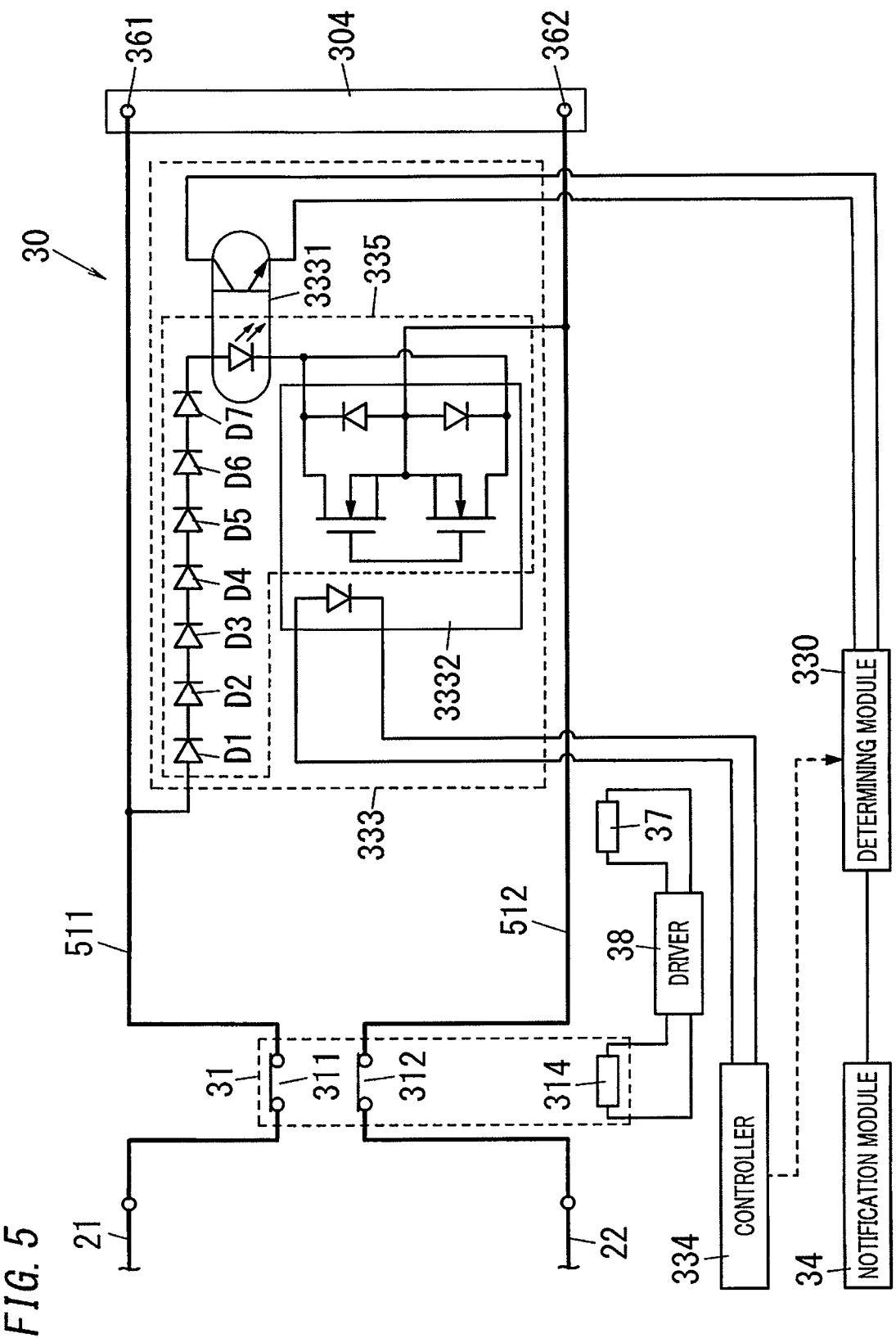
FIG. 5 is a circuit diagram of a partial portion of a connector that is common to Embodiments 3 and 4.

A specific configuration example of the processing module 33 is illustrated in FIG. 5. The illustrated processing module 33 includes a controller 334 configured to receive the content of the control on the switching device 43 performed by the electronic control unit 45 provided in the electric vehicle 40 and determines the timing of the measurement by the measuring module 333. The controller 334 of the present embodiment is configured to determine the measurement timing according to an instruction from the power conversion device 10. That is, when the end of charging or discharging of the storage battery 41 is notified from the electronic control unit 45 to the power conversion device 10, the instruction is issued from the power conversion device 10 to the controller 334. The controller 334 allows the measuring module 333 to perform measurement upon receiving the instruction from the power conversion device 10.

The measuring module 333 includes a plurality of (in this example, seven) constant-current diodes D1 to D7, a photocoupler 3331, and a semiconductor relay 3332. The plurality of constant-current diodes D1 to D7 is connected in series. The plurality of constant-current diodes D1 to D7, a primary side of the photocoupler 3331, and a secondary side of the semiconductor relay 3332 form a series circuit, and the series circuit is connected between the measurement points P1 and P2 set in the electric paths 511 and 512. Moreover, a primary side of the semiconductor relay 3332 is connected to the controller 334. Moreover, a secondary side of the photocoupler 3331 is connected to the determining module 330. The controller 334 issues an instruction on the timing at which the voltage value between the measurement points P1 and P2 is measured.

In the configuration illustrated in FIG. 5, when the semiconductor relay 3332 enters an ON state according to the instruction from the controller 334, it is determined whether the constant-current diodes D1 to D7 will be made conductive according to the voltage value between the measurement points P1 and P2. When the constant-current diodes D1 to D7 are made conductive, current flows into the primary side of the photocoupler 3331, and as a result, the secondary side of the photocoupler 3331 enters the ON state. That is, when the voltage value between the measurement points P1 and P2 exceeds the sum of forward voltages of the constant-current diodes D1 to D7 and a photodiode which is the primary side of the photocoupler 3331, the secondary side of the photocoupler 3331 enters the ON state.

The determining module 330 determines whether a malfunction has occurred in the switching device 43 provided in the electric vehicle 40 by monitoring the output of the photocoupler 3331 in a period in which the controller 334 turns the semiconductor relay 3332 on. Here, the measuring module 333 illustrated in FIG. 5 determines the voltage value at which the secondary side of the photocoupler 3331 enters the ON state with the aid of the constant-current diodes D1 to D7, the determining module 330 does not require a function of comparing the voltage value between the measurement points P1 and P2 with a threshold. In other words, the measuring module 333 illustrated in FIG. 5 also performs some of the functions of the determining module 330.

As described above, the controller 334 turns the semiconductor relay 3332 on according to the instruction from the power conversion device 10. When the semiconductor relay 3332 enters the ON state, the measuring module 333 measures the voltage value between the measurement points P1 and P2 and the determining module 330 recognizes whether the voltage of the storage battery 41 is applied to the measurement points P1 and P2 depending on whether the photocoupler 3331 is in the ON or OFF state. Moreover, the controller 334 also notifies the determining module 330 of the timing as instructed from the power conversion device 10 so that the determining module 330 receives the result of measurement by the measuring module 333.

When the power conversion device 10 issues an instruction to the controller 334, since it is estimated that the switching device 43 provided in the electric vehicle 40 has entered the open state, it is determined that a malfunction has occurred in the switching device 43 if the voltage value measured by the measuring module 333 at that time exceeds a threshold. In this example, it is assumed that the power conversion device 10 stops outputting a signal at the time point at which the power conversion device 10 issues the instruction to the controller 334.

In the configuration example, the controller 334 turns the semiconductor relay 3332 on upon receiving an instruction from the power conversion device 10 to allow the measuring module 333 to measure the voltage value. In contrast, the controller 334 may turn the semiconductor relay 3332 on when the power conversion device 10 and the electronic control unit 45 perform a checking process immediately before the movement of the latch lever 322 (see FIG. 2) is allowed by a switching mechanism 32 of the connector 30.

As described in Embodiment 1, the power conversion device 10 performs a predetermined checking process upon receiving a stop request from the electric vehicle 40 during charging or discharging of the storage battery 41 and then stops supplying electric power to an actuator 321 provided in the switching mechanism 32 of the connector 30. At the starting point of the checking process, the electronic control unit 45 has completed the control of putting the switching device 43 into the open state. Thus, the measuring module 333 measures the voltage value between the measurement points P1 and P2 in the open state of the switching device 43, and the determining module 330 determines that a malfunction has occurred in the switching device 43 when the measured voltage value exceeds a threshold.

Here, when the determining module 330 determines that a malfunction has occurred in the switching device 43, the power conversion device 10 preferably inhibits the movement of a release button 323 without stopping the supply of electric power to the actuator 321 of the switching mechanism 32. Moreover, in this case, the power conversion device 10 preferably displays a message on a display indicating that it is not possible to separate the connector 30 from the connecting port 42 due to a malfunction in the switching device 43. When the processing module 33 determines that there is no malfunction in the switching device 43, the power conversion device 10 performs a checking process in cooperation with the electronic control unit 45 and then stops the supply of electric power to the actuator 321 of the switching mechanism 32 to allow an operation on the release button 323.

In the configuration example, although the processing module 33 and the notification module 34 are provided in the connector 30, the connector 30 may include a display lamp (not illustrated) configured to display the result of determination by the processing module 33. In this configuration, the notification module 34 may be omitted.

Moreover, the determining module 330 and the controller 334 of the processing module 33 may be provided separately from the connector 30. That is, the measuring module 333 of the processing module 33 may be provided in the connector 30. In other words, the processing module 33 may be distributed to the power conversion device 10 and the connector 30.

For example, when the power conversion device 10 includes the determining module 330, the notification module 34 may send the result of measurement by the measuring module 333 to the power conversion device 10. In this configuration, the determining module 330 provided in the power conversion device 10 may determine whether a malfunction has occurred in the switching device 43 based on the information transmitted through the notification module 34 and the information instructing the measuring module 333 when to implement measurement. Moreover, when the measuring module 333 has the configuration illustrated in FIG. 5, since the information output from the measuring module 333 has two values, the configuration of the notification module 34 is the same as that of the configuration example described above.

As described above, in the present embodiment, the processing module 33 includes the measuring module 333 and the determining module 330. The measuring module 333 measures the voltage value at the measurement points P1 and P2 set in the electric paths 511 and 512 between the switching device 31 of the connector 30 and a battery (the storage battery 41). The determining module 330 compares the voltage value measured by the measuring module 333 with a threshold. Moreover, the determining module 330 determines that a malfunction has occurred when the voltage value measured by the measuring module 333 exceeds the threshold in a state in which the switching device 43 which is a second switching device intervened in the electric paths 521 and 522 which are second electric paths provided between the battery (the storage battery 41) and the connecting port 42 puts the electric paths 512 and 522 into a non-conductive state.

Therefore, according to the configuration of the present embodiment, it is possible to detect the presence or absence of a malfunction in the switching device 43 intervened in the electric paths 521 and 522 in the electric vehicle 40. As a result, even when a malfunction such as weld occurs in the switching device 43 mounted in the electric vehicle 40, it is possible to immediately take appropriate countermeasures.

Further, in the present embodiment, the determining module 330 determines that a malfunction has occurred in the switching device 43 when the voltage value measured by the measuring module 333 exceeds a threshold in a state in which no electric power is output from the power conversion device 10 and the switching device 43 is instructed to enter the open state in which the electric paths 521 and 522 are put into a non-conductive state. That is, a period in which the switching device 43 is in the open state is a period in which transmission of electric power between the connector 30 and the battery (the storage battery 41) is stopped. Moreover, a state in which the voltage value between the measurement points P1 and P2 exceeds the threshold in this period indicates a state in which a voltage is applied to a portion (the contactors 361 and 362 and the contactors 421 and 422) that electrically connects the connector 30 and the connecting port 42. Thus, the processing module 33 is configured such that determination is made that a malfunction has occurred if the above-described conditions are satisfied. By doing so, the determining module 330 can determine the presence or absence of a malfunction in the switching device 43 with a simple process of comparing the voltage value measured by the measuring module 333 with the threshold.

Here, the processing module 33 includes the measuring module 333 which is provided in the connector 30 and which measures, in the open state of the switching device 43, the voltage value between the measurement points P1 and P2 set between the switching device 31 and the contactors 361 and 362 in the electric paths 511 and 512. Moreover, the determining module 330 detects the presence or absence of a malfunction based on the result of measurement by the measuring module 333. Thus, the determining module 330 can detect the presence or absence of a malfunction in the switching device 43 based on the result of measurement by the measuring module 333 even when the temperature of the insertion portion 304 exceeds a predetermined temperature and the switching device 31 enters the open state, for example.

Moreover, in the present embodiment, the processing module 33 is provided in the connector 30, and the connector 30 includes a notification module 34 configured to send a binary signal indicating the result of determination by the processing module 33 to the power conversion device 10. That is, the processing module 33 in the connector 30 performs the process of determining the presence or absence of a malfunction in the switching device 43, and sends the binary signal indicating the determination result to the power conversion device 10. Thus, the processing module 33 can suppress an increase in the amount of data transmitted to the power conversion device 10 and can reduce the influence of noise as compared to a case in which the measurement value obtained by the measuring module 333 is transmitted to the power conversion device 10.

Embodiment 4

In Embodiment 3, as illustrated in FIG. 4, it is determined whether an abnormality has occurred in the switching device 31 provided in the connector 30 or the switching device 43 provided in the electric vehicle 40 by measuring the voltage value between the measurement points P1 and P2 set in the electric paths 511 and 512 of the connector 30. On the other hand, if a capacitive component occurring due to the electric paths 511 and 512 of the connector 30 or the electric paths 521 and 522 of the electric vehicle 40 is present, even when the switching device 31 or the switching device 43 is in the open state, the voltage value measured by the measuring module 333 may exceed a threshold. In the present embodiment, a configuration example in which a discharging module 335 is provided in a processing module 33 as illustrated in FIG. 5 in order to remove residual charges generated due to such a capacitive component will be described. In the present embodiment, the same constituent elements as those of Embodiment 3 will be denoted by the same reference numerals, and the description thereof will not be provided.

In an electric vehicle 40, a capacitive component is present between the lines of electric paths 521 and 522 between a switching device 43 and a connecting port 42. Moreover, in a connector 30, a capacitive component is present between the lines of electric paths 511 and 512 between a switching device 31 and an insertion portion 304. However, since the electric paths 511 and 512 are relatively shorter than the electric paths 521 and 522, the capacitive component in the electric paths 511 and 512 is negligible. The capacitive component in the electric paths 521 and 522 is 1 µF or smaller, for example.

When the capacitive component is present, a measuring module 333 may erroneously measure a voltage value. That is, even when the state of a switching device 43 has changed from a closed state to an open state properly, a voltage value measured by the measuring module 333 does not immediately decrease up to a threshold or lower due to the capacitive component. As a result, the determining module 330 may determine that a malfunction has occurred in the switching device 43.

In the present embodiment, a discharging module 335 is provided in the processing module 33 in order to avoid erroneous determination associated with such a capacitive component. The discharging module 335 has a function of discharging charges stored in the capacitive component. Moreover, in the present embodiment the discharging module 335 also functions as the measuring module 333. That is, the processing module 33 does not include the discharging module 335 separately but allows the measuring module 333 to function also as the discharging module 335. Thus, an increase in the number of components is suppressed while providing the discharging module 335.

That is, the measuring module 333 has a configuration illustrated in FIG. 5. When a semiconductor relay 3332 enters an ON state, the measuring module 333 having this configuration allows the measurement points P1 and P2 to be made conductive through a series circuit formed by a plurality of constant-current diodes D1 to D7 and a primary side of a photocoupler 3331. Thus, if residual charges are present in the capacitive component, the residual charges are discharged through the series circuit.

In the present embodiment, the processing module 33 measures the voltage value between the measurement points P1 and P2 after the elapse of a predetermined delay period determined as a period required for discharging the residual charges after the semiconductor relay 3332 enters the ON state. Thus, the influence of the residual charges on the voltage value measured by the measuring module 333 is removed, and it is possible to accurately determine whether a malfunction has occurred in the switching device 43 based on the voltage value. That is, the processing module 33 measures the voltage value between the measurement points P1 and P2 with the aid of the measuring module 333 after removing the residual charges with the discharging module 335 which also functions as the measuring module 333 and determines the presence or absence of a malfunction in the switching device 43 with the aid of the determining module 330 based on the result of measurement by the measuring module 333.

Figure 6:
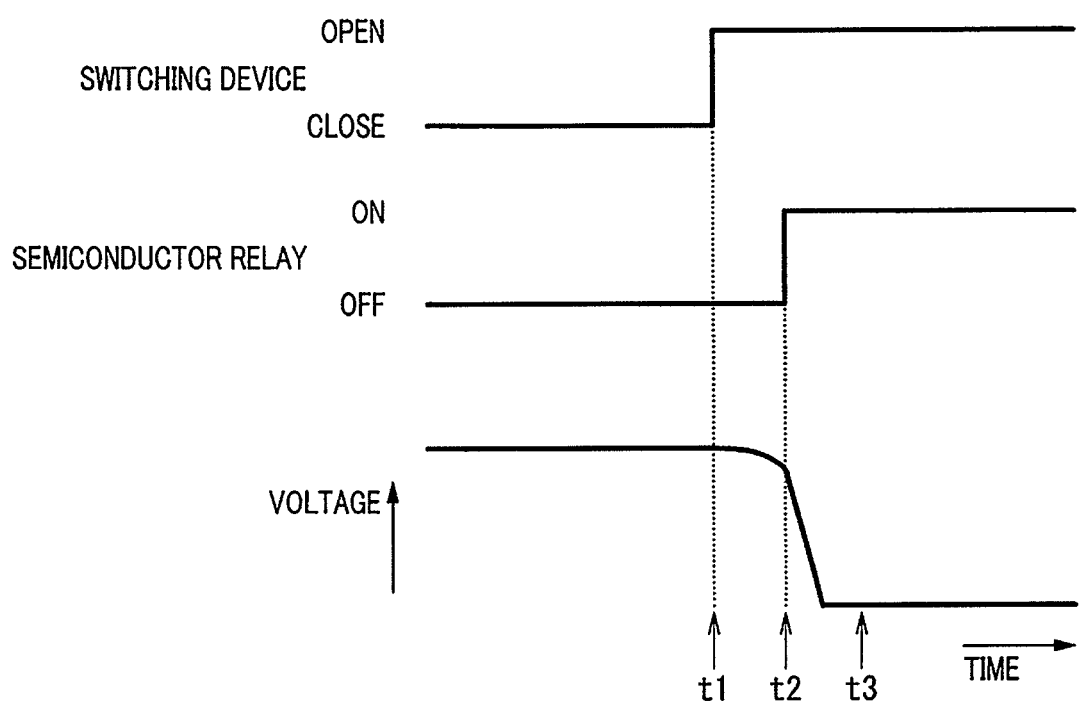
FIG. 6 is a diagram for describing an operation of Embodiment 4.

An operation of the present embodiment will be described briefly with reference to FIG. 6. A graph on top of FIG. 6 indicates whether the switching device 43 is in the open state or the closed state, a graph at the middle indicates whether the semiconductor relay 3332 is in the ON or OFF state, and a graph at the bottom indicates a change in the voltage value between the measurement points P1 and P2. In FIG. 6, it is assumed that the output of the power conversion device 10 is not applied to the measurement points P1 and P2.

At time t1, when the switching device 43 enters the open state from the closed state, the storage battery 41 is separated from the measurement points P1 and P2. Thus, residual charges present in the capacitive component are gradually discharged due to self-discharge, and the voltage value between the measurement points P1 and P2 decreases a little. After that, at time t2, when the controller 334 turns the semiconductor relay 3332 on, the measuring module 333 functions as the discharging module 335 and the voltage value between the measurement points P1 and P2 decreases rapidly. When a predetermined delay period elapses after time t2, the determining module 330 reads the voltage value measured by the measuring module 333 and determines whether a malfunction has occurred in the switching device 43. Ideally, the voltage value measured by the measuring module 333 is 0 V, and if the switching device 43 has entered the open state properly, the determining module 330 determines that the switching device 43 is normal.

As described above, according to the configuration of the present embodiment, the connector 30 includes the discharging module 335 configured to discharge residual charges generated by a capacitive component between the switching device 43 and the power conversion device 10 in the electric paths 511 and 512 between the power conversion device 10 and a battery (the storage battery 41). Thus, the processing module 33 can avoid detection errors resulting from the influence of residual charges in the capacitive component. Further, in the present embodiment, the discharging module 335 also functions as the measuring module 333. Thus, the configuration is simpler than a case in which the discharging module 335 is provided separately from the measuring module 333.

The other configuration and function of the present embodiment are the same as the configuration and function of Embodiment 3. Moreover, the discharging module 335 may be provided separately from the measuring module 333. Further, the configuration described in the present embodiment may be appropriately combined with a modified example of Embodiment 3.

Embodiment 5

In the embodiments described above, a configuration in which it is determined whether a malfunction has occurred in a switching device 31 provided in a connector 30 or a switching device 43 provided in an electric vehicle 40 has been described. In the present embodiment, a configuration in which, when a malfunction has occurred in any one of switching devices 31 and 43, a body 301 (see FIG. 2) of a connector 30 is maintained in the attached state relative to a connecting port 42 will be described. When a release button 323 is operated in a state in which the body 301 is in an attached state relative to the connecting port 42 and a predetermined condition is satisfied, the body 301 can be put into an unattached state relative to the connecting port 42.

Figure 7:
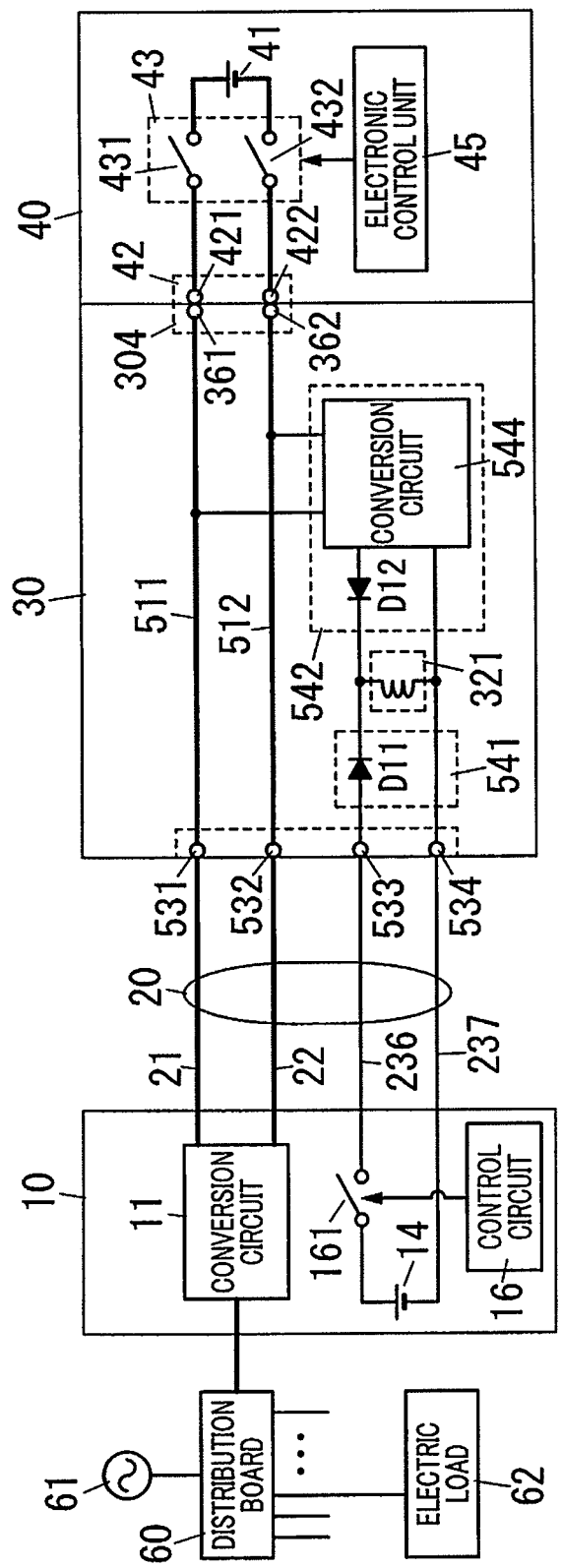
FIG. 7 is a block diagram illustrating Embodiment 5.

As illustrated in FIG. 7, the connector 30 includes terminals 531 to 534 to which a cable 20 is connected. In the illustrated example, the connector 30 includes the terminal 531 that connects a power supply line 21 to an electric path 511, the terminal 532 that connects a power supply line 22 to an electric path 512, and the terminals 533 and 534 that connect two control lines 236 and 237 included in the cable 20. Although the two control lines 236 and 237 preferably function also as the control lines 231 to 235 described in Embodiment 1, in this example, the control lines 236 and 237 will be distinguished from the control lines 231 to 235 in order to simplify the description. The control lines 236 and 237 may also function as a communication line for CAN communication. Moreover, FIG. 7 illustrates main constituent elements of the connector 30 of the present embodiment, and the constituent elements such as the switching device 31, a processing module 33, and the like are omitted. These constituent elements are provided according to the embodiments described above.

The electric path 511 is provided between the terminal 531 and a contactor 361 and the electric path 512 is provided between the terminal 532 and a contactor 362. The connector 30 of the present embodiment includes a first power feeding module 541 connected to the terminals 533 and 534 and a second power feeding module 542 connected to the contactors 361 and 362. Moreover, an actuator 321 of the switching mechanism 32 is connected so as to be supplied with electric power from both the first and second power feeding modules 541 and 542. The first power feeding module 541 supplies electric power from the power conversion device 10 to the actuator 321, and the second power feeding module 542 supplies electric power at least from the electric vehicle 40 to the actuator 321.

As described in Embodiment 1, the switching mechanism 32 selects between a lock state and an unlock state according to the operation of the actuator 321. In the lock state, removal of the body 301 from the connecting port 42 is inhibited in a state in which the body 301 is attached to the connecting port 42. Moreover, in the unlock state, removal of the body 301 from the connecting port 42 is allowed in a state in which the body 301 is attached to the connecting port 42. The actuator 321 enters the lock state when electric power is supplied and enters the unlock state when the supply of electric power stops.

Thus, the switching mechanism 32 enters the lock state when electric power is supplied from the power conversion device 10 to the first power feeding module 541 through the terminals 533 and 534 and when electric power is supplied from the electric vehicle 40 to the second power feeding module 542 through the contactors 361 and 362.

The power conversion device 10 of the present embodiment includes a conversion circuit 11, a control power supply 14 configured to supply electric power to the connector through the control lines 236 and 237, and a control circuit 16 configured to select whether or not to supply electric power to the first power feeding module 541. The control circuit 16 controls the timing at which a control switch 161 connected in series to the control power supply 14 enters the ON state. The control power supply 14 supplies electric power to the first power feeding module 541 through the cable 20 in the ON period of the control switch 161.

The terminals 531 and 532 of the connector 30 are electrically connected to the conversion circuit 11 of the power conversion device 10 via the power supply lines 21 and 22 of the cable 20. Moreover, the terminals 533 and 534 of the connector 30 are electrically connected to a series circuit formed by the control power supply 14 and the control switch 161 in the power conversion device 10 via the control lines 236 and 237 of the cable 20.

The first power feeding module 541 is configured to supply electric power to the switching mechanism 32 using the electric power supplied from the power conversion device 10 through the control lines 236 and 237 which are separate paths from the power supply lines 21 and 22. Moreover, the second power feeding module 542 is configured to supply electric power to the switching mechanism 32 using the electric power supplied from the electric paths 511 and 512 electrically connected to the power supply lines 21 and 22.

As illustrated in FIG. 7, the first power feeding module 541 is provided between the terminals 533 and 534 electrically connected to the control lines 236 and 237 and the actuator 321 of the switching mechanism 32. The first power feeding module 541 supplies the electric power supplied from the control power supply 14 through the control lines 236 and 237 to the actuator 321 of the switching mechanism 32 in the ON period of the control switch 161. The control switch 161 is controlled by the control circuit 16 and enters the ON state in a period in which a storage battery 41 is charged or discharged and enters the OFF state in a period in which the storage battery 41 is not charged or discharged.

Moreover, the first power feeding module 541 includes a diode D11 connected between the terminal 533 and the actuator 321. The diode D11 is connected in such a direction as to block the current flowing from a coil for driving the actuator 321 toward the terminal 533. Thus, the diode D11 functions to prevent the electric power supplied from the second power feeding module 542 to the actuator 321 from leaking to the power conversion device 10 through the first power feeding module 541.

The second power feeding module 542 includes a conversion circuit 544 connected to the electric paths 511 and 512. The connection points between the conversion circuit 544 and the electric paths 511 and 512 are preferably between the switching device 31 (see FIG. 1) and the contactors 361 and 362. The conversion circuit 544 is a DC/DC converter and supplies DC electric power obtained by decreasing the voltage between the lines of the electric paths 511 and 512 to the actuator 321 of the switching mechanism 32. The DC voltage value output from the conversion circuit 544 is preferably set to a voltage value lower than the control power supply 14 of the control circuit 16 provided in the power conversion device 10. The second power feeding module 542 is configured to supply electric power to the actuator 321 of the switching mechanism 32 using one of the electric power from the storage battery 41 provided in the electric vehicle 40 and the electric power from the conversion circuit 11 provided in the power conversion device 10.

The second power feeding module 542 includes a diode D12 connected between the conversion circuit 544 and the actuator 321 in addition to the conversion circuit 544. The diode D12 is connected in such a direction as to block the current flowing from a coil for driving the actuator 321 toward the conversion circuit 544. Thus, the diode D12 functions to prevent the electric power supplied from the first power feeding module 541 to the actuator 321 from leaking to the electric vehicle 40 through the second power feeding module 542. The diodes D11 and D12 are not essential but any one or both may be omitted.

As described above, the actuator 321 of the switching mechanism 32 provided in the connector 30 is supplied with electric power from the control power supply 14 of the power conversion device 10 through the first power feeding module 541 and is supplied with electric power from the electric paths 511 and 512 through the second power feeding module 542.

Thus, in the configuration of the present embodiment, since electric power is supplied to the actuator 321 through the conversion circuit 544 in a period in which transmission of electric power between the power conversion device 10 and the storage battery 41 is performed, an operation on the release button 323 is inhibited in this period. That is, in the period in which transmission of electric power between the power conversion device 10 and the storage battery 41 is performed, the lock state of the switching mechanism 32 is maintained. In other words, the release button 323 is prevented from being operated in a state in which the switching device 31 of the connector 30 illustrated in FIG. 1 and other drawings or the switching device 43 of the electric vehicle 40 is not cut off and a voltage is applied to the contactors 361 and 362 or the contactors 421 and 422.

Moreover, even when electric power is not supplied from the power conversion device 10 to the actuator 321 of the switching mechanism 32 due to a malfunction such as a disconnection of the cable 20, electric power is supplied from the storage battery 41 of the electric vehicle 40 to the actuator 321 through the second power feeding module 542. As a result, the switching mechanism 32 is maintained in the lock state even when a malfunction such as disconnection occurs in the cable 20.

As described above, the connector 30 of the present embodiment is rarely released from the lock state even when a malfunction occurs in the switching device 31 or 43 or the cable 20. In other words, for example, when the cable 20 is disconnected so that electric power is not supplied from the power conversion device 10, and a malfunction such as weld of the switching device 43 of the electric vehicle 40 occurs, the lock state of the switching mechanism 32 is maintained due to the electric power from the storage battery 41. As a result, the connector 30 is rarely separated from the connecting port 42, and the contactors 421 and 422 of the connecting port 42 are avoided from being exposed in a state of being electrically connected to the storage battery 41.

Moreover, the second power feeding module 542 supplies electric power to the actuator 321 using the electric power from the electric paths 511 and 512. With this configuration, the electric power from the storage battery 41 of the electric vehicle 40 is supplied to the actuator via the electric paths 511 and 512 connected to the conversion circuit 11 of the power conversion device 10. As a result, a benefit can be achieved where it is not necessary to increase the number of poles of the contactors of the insertion portion 304 (see FIG. 2) of the connector 30 and the connecting port 42 in order to supply electric power from the storage battery 41 to the actuator 321.

As described above, when the voltage value output from the conversion circuit 544 is set to be lower than the voltage value output from the control power supply 14, the first power feeding module 541 supplies electric power to the actuator 321 in preference to the second power feeding module 542. Thus, it is possible to reduce the period in which electric power is supplied from the storage battery 41 to the actuator 321 and as a result to suppress a decrease in the remaining capacity of the storage battery 41.

In the configuration example, although the power supply lines 21 and 22 of the cable 20 are connected to the terminals 531 and 532 of the connector 30, the terminals 531 and 532 may not be provided between the power supply lines 21 and 22 of the cable 20 and the electric paths 511 and 512 of the connector 30. That is, the power supply lines 21 and 22 of the cable 20 may be extended to form the electric paths 511 and 512. In this case, the contactors 361 and 362 provided in the connector 30 are directly connected to the power supply lines 21 and 22 of the cable 20.

The connector 30 described in the present embodiment includes the body 301, the switching mechanism 32, the first power feeding module 541, and the second power feeding module 542. The attached state and the unattached state of the body 301 relative to the connecting port 42 provided in an apparatus (the electric vehicle 40) having a battery (the storage battery 41) mounted therein can be selected. The switching mechanism 32 includes the actuator 321. The switching mechanism 32 is configured, when the body 301 is in the attached state relative to the connecting port 42, to select between a lock state in which removal of the body 301 from the connecting port 42 is inhibited and an unlock state in which removal of the body 301 from the connecting port 42 is allowed.

The first power feeding module 541 supplies electric power from the power conversion device 10 connected to a power system to the actuator 321. The second power feeding module 542 supplies electric power from at least the apparatus (the electric vehicle 40) of the power conversion device 10 and the apparatus (the electric vehicle 40) to the actuator 321. The actuator 321 puts the switching mechanism 32 into the lock state in a period in which electric power is supplied and puts the switching mechanism 32 into the unlock state in a period in which electric power is not supplied.

According to the configuration of the present embodiment, since electric power is supplied to the actuator 321 from two system of the first and second power feeding modules 541 and 542, electric power is supplied to the actuator 321 through two paths and the lock state is rarely released in the event of a malfunction.

In the connector 30 of the present embodiment, the first power feeding module 541 receives electric power from the power conversion device 10 through a separate path from the electric paths 511 and 512 between the power conversion device 10 and the battery (the storage battery 41). Moreover, the second power feeding module 542 receives electric power from the electric paths 511 and 512 between the power conversion device 10 and the battery (the storage battery 41). Thus, the power receiving paths of the first and second power feeding modules 541 and 542 are separated, and electric power can be easily secured in the actuator 321.

The connector 30 of the present embodiment forms a power conversion system by being electrically connected to the power conversion device 10 via the cable 20. Moreover, the connector 30 supplies driving electric power from the control power supply 14 to the switching mechanism 32 via the control line 23 during charging and discharging of the storage battery 41 and puts the switching mechanism 32 into the lock state. That is, removal of the body 301 from the connecting port 42 is inhibited during charging or discharging of the storage battery 41.

Moreover, although not illustrated in FIG. 7, electric power is also supplied to the actuator 321 so that the switching mechanism 32 is maintained in the lock state similarly when the processing module 33 used in the embodiments described above has detected a malfunction as well as during charging or discharging. Thus, the controller 552 is preferably configured to turn the switching device 551 off only when the processing module 33 has not detected a malfunction and charging or discharging is not performed.

The configuration and operation of the present embodiment other than the above-described configuration and operation are the same as those of Embodiment 1. That is, although FIG. 7 illustrates only main constituent elements required for description of the present embodiment, the other constituent elements are provided according to Embodiment 1. Moreover, the configurations of the embodiments described above may be appropriately combined with the configuration of the present embodiment.

Embodiment 6

Figure 8:
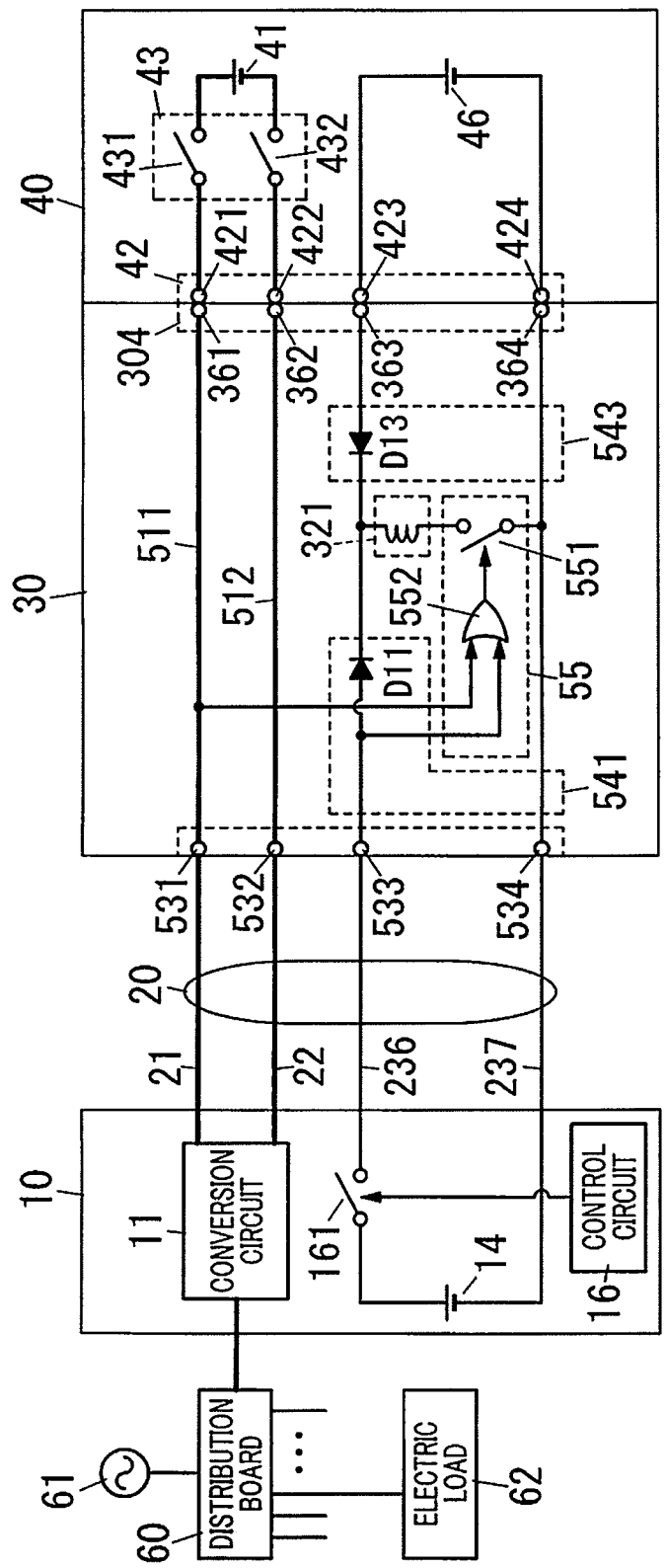
FIG. 8 is a block diagram illustrating Embodiment 6.

As illustrated in FIG. 8, a connector 30 of the present embodiment is different from the configuration of the connector 30 described in Embodiment 5 in that the connector 30 includes a switching circuit 55 and a second power feeding module 543 instead of the second power feeding module 542. Although the second power feeding module 542 receives electric power from the electric paths 511 and 512, the second power feeding module 543 receives electric power from an on-vehicle battery 46 as an auxiliary power supply. The same constituent elements as those of Embodiment 5 will be denoted by the same reference numerals, and the description thereof will not be provided.

The second power feeding module 543 is configured to supply electric power to an actuator 321 using the electric power from the on-vehicle battery 46 as the auxiliary power supply provided separately from a storage battery 41 which is a travelling energy source of an electric vehicle 40. The on-vehicle battery 46 has a smaller capacity than the storage battery 41 and supplies electric power for driving devices that form an interior environment of the electric vehicle 40, electric power for operating the electronic control unit 45, and the like. The on-vehicle battery 46 is a lead-acid storage battery, for example, and outputs DC 12 V, for example. When the apparatus is not the electric vehicle 40, another auxiliary power supply is provided instead of the on-vehicle battery 46.

For the second power feeding module 543 to use the electric power from the on-vehicle battery 46, the connecting port 42 includes contactors 423 and 424 connected to the on-vehicle battery 46, and the insertion portion 304 includes contactors 363 and 364 connected to the second power feeding module 543. When the body 301 of the connector 30 is in the attached state relative to the connecting port 42, the contactors 363 and 364 make contact with the contactors 423 and 424 and the second power feeding module 543 is electrically connected to the on-vehicle battery 46.

The switching circuit 55 includes a switching device 551 connected in series to a coil of the actuator 321 and a controller 552 configured to turn the switching device 551 on or off according to the following conditions. The controller 552 turns the switching device 551 on when at least one of the voltage value between the electric paths 511 and 512 and the voltage value between the terminals 533 and 534 is equal to or higher than a predetermined threshold. The switching device 551 may be an electromagnetic relay or a semiconductor relay. FIG. 8 schematically illustrates a connection relation of the switching circuit 55, and the switching circuit 55 is connected to an electric path 511 and a terminal 533. Actually, the switching circuit 55 is connected so as to monitor a voltage value between the electric paths 511 and 512 and a voltage value between the terminals 533 and 534.

A controller 552 of the switching circuit 55 is configured to output a logical sum of a condition that the voltage value between the electric paths 511 and 512 is equal to or higher than a threshold and a condition that the voltage value between the terminals 533 and 534 is equal to or higher than a threshold. That is, the switching device 551 enters the ON state when at least one of the two conditions is satisfied. The controller 552 includes an OR circuit in order to combine such conditions. Moreover, the controller 552 turns the switching device 551 off if both the voltage value between the electric paths 511 and 512 and the voltage value between the terminals 533 and 534 are smaller than the threshold. In other words, the switching circuit 55 turns the switching device 551 on when a voltage is applied to the electric paths 511 and 512 and when a voltage is applied from the control power supply 14 of the power conversion device 10 to the terminals 533 and 534.

In the above-described configuration, electric power can be supplied from the first power feeding module 541 or the second power feeding module 543 to the actuator 321 of the switching mechanism 32 in the ON period of the switching device 551. That is, the first power feeding module 541 supplies electric power to the actuator 321 of the switching mechanism 32 using the electric power supplied from the control circuit 16 of the power conversion device 10 through the control lines 236 and 237 in the ON period of the switching device 551. Moreover, the second power feeding module 543 supplies electric power to the actuator 321 of the switching mechanism 32 using the electric power supplied from the on-vehicle battery 46 of the electric vehicle 40 through the contactors 363 and 364 in the ON period of the switching device 551.

Thus, if the contacts 431 and 432 of the switching device 43 are to be in the open state but are not in the open state, since the voltage of the storage battery 41 is applied to the electric paths 511 and 512, the switching device 551 enters the ON state and the lock state is maintained.

The first power feeding module 541 includes a diode D11 between the terminal 533 and the coil of the actuator 321 similarly to Embodiment 1. Moreover, the second power feeding module 543 includes a diode D13 between the contactor 363 and the coil of the actuator 321. The diode D13 is connected in such a direction as to block the current flowing from the coil for driving the actuator 321 of the switching mechanism 32 toward the contactor 363.

The diodes D11 and D13 are not essential but any one or both may be omitted. Here, similarly to Embodiment 5, the controller 552 is preferably configured to turn the switching device 551 off when the processing module 33 has not detected a malfunction and charging or discharging is not performed.

The connector 30 of the present embodiment described above includes the switching circuit 55 in which the switching device 551 intervened between the first and second power feeding modules 541 and 542 and the actuator 321 is provided. The first power feeding module 541 is configured to receive electric power from the power conversion device 10 through a separate path from the electric paths 511 and 512 between the power conversion device 10 and a battery (the storage battery 41). Moreover, the second power feeding module 542 is configured to receive electric power from an auxiliary power supply (the on-vehicle battery 46) provided in the apparatus (the electric vehicle 40) through a separate path from the electric paths 511 and 512. The switching circuit 55 includes the controller 552 configured to turn the switching device 551 on when at least one of the voltage value received by the first power feeding module 541 and the voltage value of the electric paths 511 and 512 is equal to or higher than a predetermined threshold. Here, in the present embodiment, the first power feeding module 541 is configured to receive electric power from the control power supply 14 provided in the power conversion device 10.

According to the configuration of the connector 30, since it is not necessary to provide the conversion circuit 544 (see FIG. 7) in the body 301 as described in Embodiment 5, it is possible to reduce the size of the body 301. Further, in the connector 30 of the present embodiment, when electric power is supplied to the electric paths 511 and 512 or when electric power is supplied from the auxiliary power supply (the on-vehicle battery 46) of the apparatus (the electric vehicle 40), the switching device 551 enters the ON state and electric power is supplied to the actuator 321. Thus, if a voltage is applied to the electric paths 511 and 512 or if a voltage is applied from the auxiliary power supply (the on-vehicle battery 46), the connector 30 can maintain the lock state. Further, according to the configuration of the present embodiment, since the first power feeding module 541 also received electric power from the control power supply 14 provided in the power conversion device 10, it is not necessary to receive electric power from the electric paths 511 and 512 between the power conversion device 10 and the battery (the storage battery 41). Thus, the first and second power feeding modules 541 and 542 can be formed only of components that are compatible with a voltage of approximately 12 V, for example.

Figure 9:
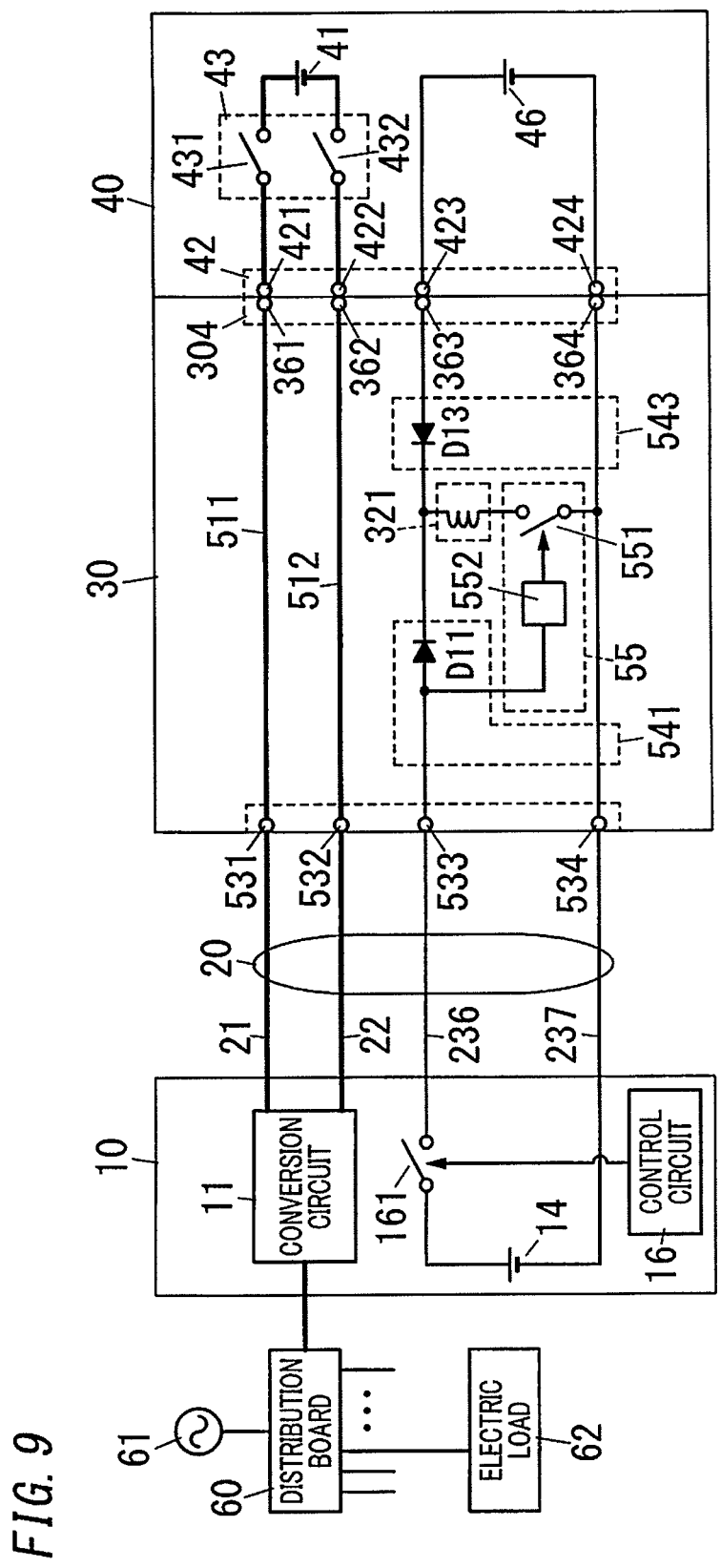
FIG. 9 is a block diagram illustrating a modified example of Embodiment 6.

A modified example of the present embodiment is illustrated in FIG. 9. In the configuration example illustrated in FIG. 9, the switching circuit 55 switches the switching device 551 on and off based on the voltage value between the terminals 533 and 534. The switching circuit 55 is configured to turn the switching device 551 on when the voltage value between the terminals 533 and 534 rises and to turn the switching device 551 off when the voltage value between the terminals 533 and 534 falls. That is, the switching circuit 55 is configured as a self-holding switching circuit that detects a rise of a voltage value to hold the switching device 551 in the ON state and that detects a fall of a voltage value to hold the switching device 551 in the OFF state.

That is, the connector 30 of the modified example illustrated in FIG. 9 includes the switching circuit 55 in which the switching device 551 intervened between the first and second power feeding modules 541 and 542 and the actuator 321 is provided. The first power feeding module 541 is configured to receive electric power from the power conversion device 10 through a separate path from the electric paths 511 and 512 between the power conversion device 10 and a battery (the storage battery 41). Moreover, the second power feeding module 542 is configured to receive electric power from an auxiliary power supply (the on-vehicle battery 46) provided in the apparatus (the electric vehicle 40) through a separate path from the electric paths 511 and 512. Further, the switching device 551 is a self-holding switching device, and the switching circuit 55 is configured to turn the switching device 551 on when the voltage value received by the first power feeding module 541 rises and off when the voltage value falls. The first power feeding module 541 includes a backflow prevention diode D11 between a portion that receives electric power from the power conversion device 10 and a portion that supplies electric power to the actuator.

The switching circuit 55 is implemented by including a gate turn-off (GTO) thyristor as the switching device 551. When the switching device 551 includes the GTO thyristor, the controller 552 is configured to output a positive-polarity pulse when the voltage value between the terminals 533 and 534 rises and to output a negative-polarity pulse when the voltage value between the terminals 533 and 534 falls.

Thus, when the voltage value between the terminals 533 and 534 rises, the controller 552 inputs a positive-polarity pulse current to the gate of the switching device 551 to turn the switching device 551 on. After that, the switching circuit 55 maintains the ON state until a reverse current flows into the gate or when the current flowing through the switching device 551 reaches a predetermined value or lower. Subsequently, when the voltage value between the terminals 533 and 534 falls, the controller 552 inputs a negative-polarity pulse current to the gate of the switching device 551 to turn the switching device 551 off.

In this configuration, when the voltage value that the power conversion device 10 applies from the control power supply 14 to the connector 30 rises, the switching device 551 enters the ON state and the switching mechanism 32 enters the lock state. Moreover, when the voltage value that the power conversion device 10 applies from the control power supply 14 to the connector 30 falls, the switching device 551 enters the OFF state and the switching mechanism 32 enters the unlock state.

In this configuration, the switching circuit 55 is a self-holding switching circuit, and the controller 552 of the switching circuit 55 only needs to detect a rise and a fall of the voltage value between the terminals 533 and 534 and does not consume electric power in other periods. Thus, the power consumed by the controller 552 is suppressed.

The switching device 551 for the switching circuit 55 is not limited to the GTO thyristor, but may be other transistors such as a bipolar transistor or a metal-oxide-semiconductor field-effect transistor (MOSFET). When the switching device 551 includes a transistor, the self-hold switching circuit 55 may be implemented by forming the controller 552 of a flip-flop.

For example, a case in which the controller 552 includes, e.g., a JK flip-flop will be described. A JK flip-flop operates to invert an output value of an output terminal (Q terminal) whenever an input to a clock terminal (ELK terminal) rises if both inputs of J and K terminals have an H level (logical value of 1). That is, the JK flip-flop operates as a T flip-flop when both inputs of J and K terminals have the H level.

When the controller 552 of the switching circuit 55 includes a flip-flop, the controller 552 is configured to input a trigger signal to the flip-flop according to a rise and a fall of the voltage value between the terminals 533 and 534. With such a configuration, the switching circuit 55 performs a self-holding operation similarly to the switching circuit 55 including the GTO thyristor. That is, the connector 30 puts the switching mechanism 32 into the lock state when the voltage value between the terminals 533 and 534 rises and puts the switching mechanism 32 into the unlock state when the voltage value between the terminals 533 and 534 falls.

In the modified example described above, the controller 552 only needs to receive electric power from the power conversion device 10 only in a period in which the switching device 551 is switched on and off, and it is not necessary to continuously supply electric power to the controller 552 in a period in which the switching device 551 is maintained in the ON state. The switching mechanism 32 maintains the lock state by receiving electric power from the on-vehicle battery 46 of the electric vehicle 40. Moreover, electric power may be continuously supplied from the control power supply 14 to the connector 30 in the ON period of the switching device 551. In this configuration, it is possible to suppress consumption of the power of the on-vehicle battery 46.

In the modified example described above, although the controller 552 configured to control the tuning on/off of the switching device 551 is provided in the connector 30, the controller 552 may be provided in the power conversion device 10.

In a modified example illustrated in FIG. 9, the diode D11 provided in the first power feeding module 541 prevents electric power from the on-vehicle battery 46 mounted in the electric vehicle 40 from being input to the controller 552. Thus, the switching device 551 is prevented from being erroneously turned on or off due to the influence of the voltage of the on-vehicle battery 46. In this manner, since the backflow prevention diode D11 is intervened between a portion in which the first power feeding module 541 receives electric power from the power conversion device 10 and a portion in which electric power is supplied from the first power feeding module 541 to the actuator 321, malfunctioning of the switching device 551 is prevented. The diode D13 may be omitted.

The contactor of the insertion portion 304 of the connector 30, for supplying electric power from the on-vehicle battery 46 to the second power feeding module 543 is preferably a contactor which is not used for other use. That is, a non-used contactor of the connector 30 is preferably used for supplying electric power from the on-vehicle battery 46 to the second power feeding module 543.

The other configuration and function other than those described above are the same as the configuration and function of Embodiment 5. That is, although FIG. 9 illustrates only main constituent elements required for description of the present embodiment, the other constituent elements are provided according to Embodiment 1. Moreover, the configurations of Embodiments 1 to 5 described above may be appropriately combined with the configuration of the present embodiment.

Embodiment 7

Figure 10:
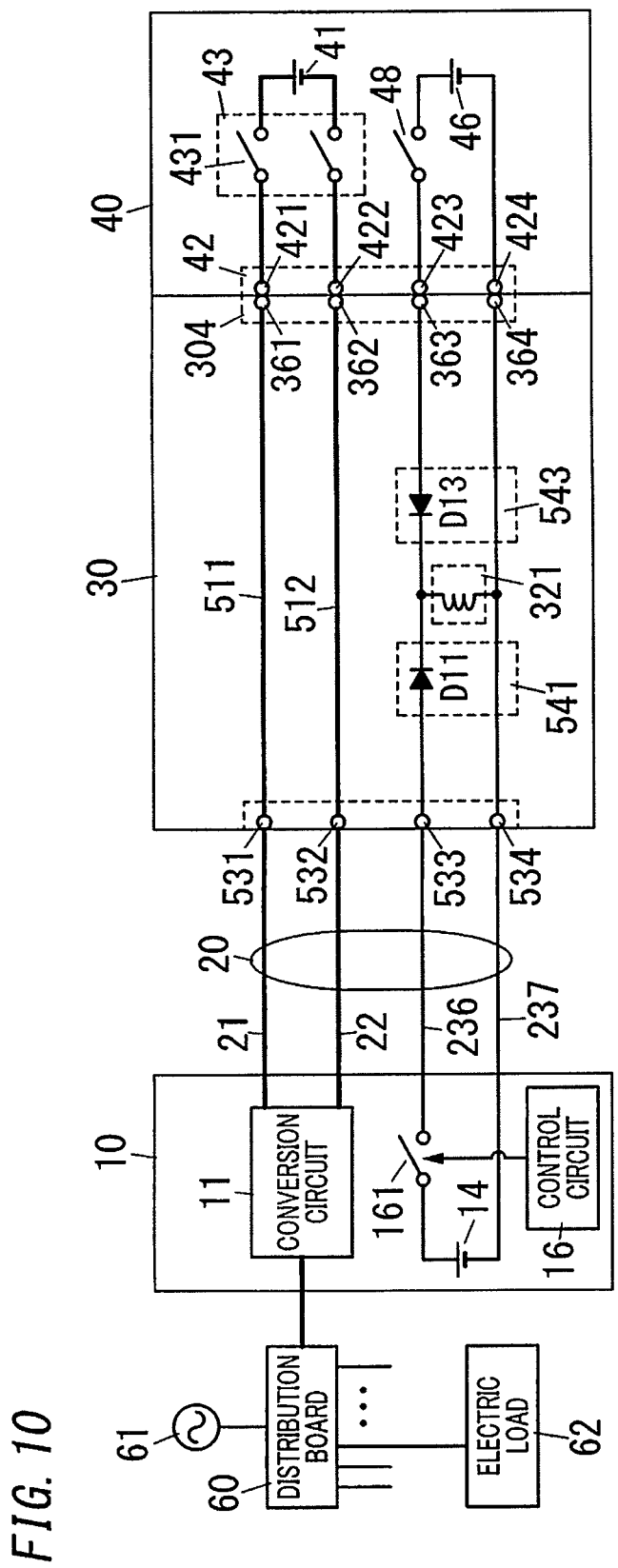
FIG. 10 is a block diagram illustrating Embodiment 7.

As illustrated in FIG. 10, a connector 30 of the present embodiment has a configuration in which the switching circuit 55 is omitted from the configuration of Embodiment 6 illustrated in FIG. 9, and an auxiliary switch 48 is provided between an on-vehicle battery 46 and a contactor 423 of the electric vehicle 40. Hereinafter, the same constituent elements as those of Embodiment 6 will be denoted by the same reference numerals, and the description thereof will not be provided.

That is, in the connector 30 of the present embodiment, a first power feeding module 541 is configured to receive electric power from a power conversion device 10 through a separate path from electric paths 511 and 512 between the power conversion device 10 and a battery (the storage battery 41) and to supply electric power to an actuator 321. Moreover, a second power feeding module 542 is configured to receive electric power through a separate path from the electric paths 511 and 512 from an auxiliary power supply (the on-vehicle battery 46) provided in an apparatus (the electric vehicle 40) and to supply electric power to the actuator 321.

As described above, in the present embodiment, the electric vehicle 40 includes the auxiliary switch 48 between the on-vehicle battery 46 and a terminal 422. Thus, the on-vehicle battery 46 can supply electric power to the second power feeding module 543 only in a period in which the connector 30 is connected to the connecting port 42 and the auxiliary switch 48 enters the ON state. In other words, even when the connector 30 is connected to the connecting port 42, if the auxiliary switch 48 enters the OFF state, electric power is not supplied from the on-vehicle battery 46 to the second power feeding module 543.

The ON state and the OFF state of the auxiliary switch 48 are selected according to an instruction that the electronic control unit 45 of the electric vehicle 40 receives from the power conversion device 10 according to CAN communication. When the power conversion device 10 recognizes that the connector 30 is connected properly, the ON state of the auxiliary switch 48 is selected. Moreover, when the auxiliary switch 48 is in the ON state, and the cable 20, for example, is disconnected, since the electric vehicle 40 cannot receive an instruction from the power conversion device 10, the ON state of the auxiliary switch 48 is maintained.

Thus, even when a malfunction such as disconnection of the cable 20 occurs and electric power is not supplied from the power conversion device 10 to the switching mechanism 32, for example, the connector 30 is supplied with the electric power from the on-vehicle battery 46 of the electric vehicle 40 to the switching mechanism 32 through the second power feeding module 543. That is, the switching mechanism 32 can maintain the lock state. In the configuration of the present embodiment, the connector 30 does not include the switching circuit 55 (see FIG. 8) described in Embodiment 6. Thus, by employing the configuration of the present embodiment, it is possible to reduce the size of the body 301 further than the configuration of Embodiment 6.

The other configuration and function other than those described above are the same as the configuration and function of Embodiment 6. That is, although FIG. 10 illustrates only main constituent elements required for description of the present embodiment, the other constituent elements are provided according to Embodiment 1. Moreover, the configurations of Embodiments 1 to 5 described above may be appropriately combined with the configuration of the present embodiment.

Embodiment 8

Figure 11:
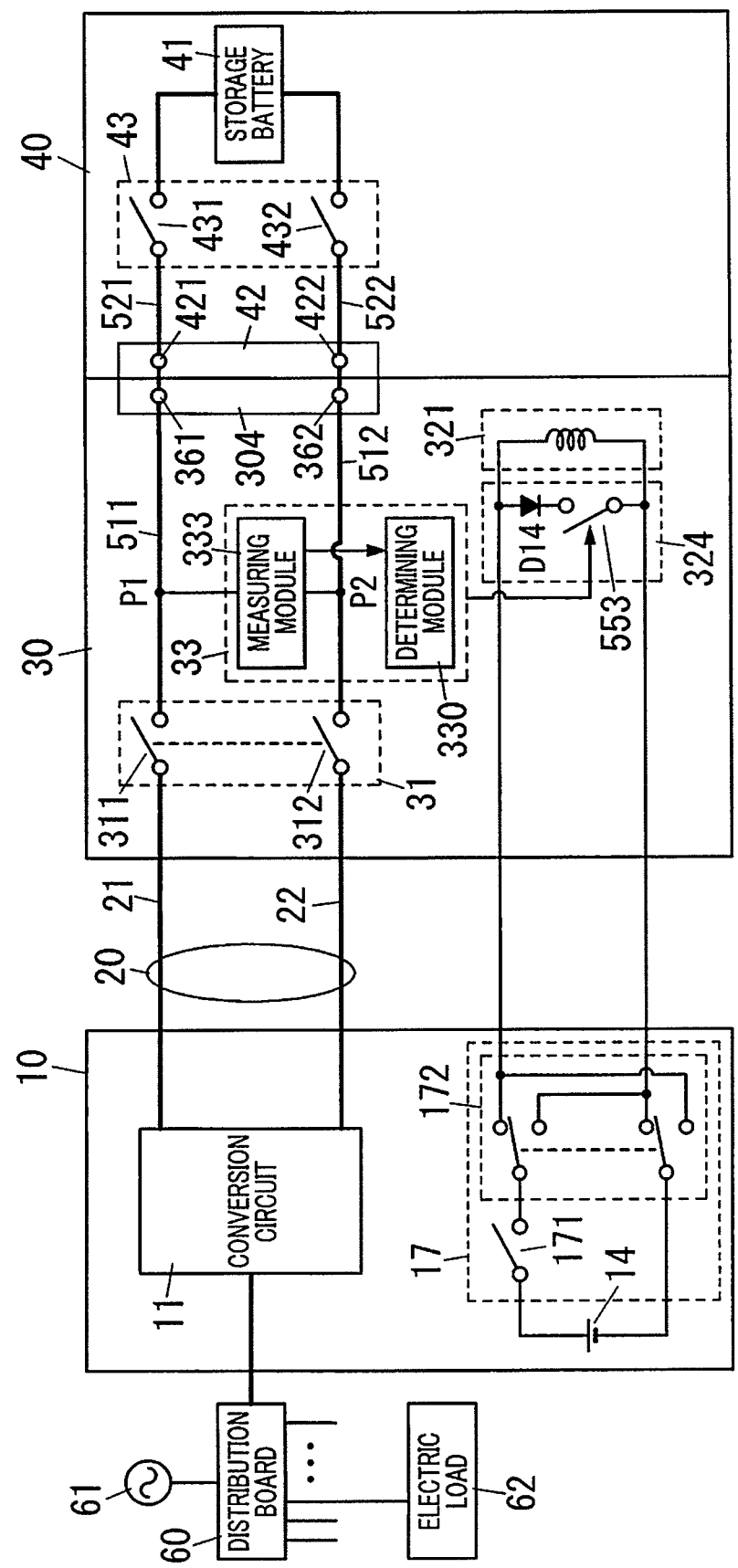
FIG. 11 is a block diagram illustrating Embodiment 8.

As illustrated in FIG. 11, a connector 30 of the present embodiment has a configuration in which an operation of an actuator 321 of a switching mechanism 32 is controlled by a control signal from a power conversion device 10 in the configuration of Embodiment 2 illustrated in FIG. 4. The same constituent elements as those of Embodiment 2 will be denoted by the same reference numerals, and the description thereof will not be provided.

The power conversion device 10 of the present embodiment includes a pulse generator 17 configured to output pulses using the electric power of a control power supply 14 in addition to a conversion circuit 11 and the control power supply 14. In the configuration example illustrated in FIG. 11, the pulse generator 17 includes a control switch 171 and a changeover switch 172. The control power supply 14 is connected to the changeover switch 172 via the control switch 171. An upper-limit of an output current of the control power supply 14 is preferably limited.

The changeover switch 172 outputs electric power for driving the actuator 321 of the switching mechanism 32 for a short period as necessary in a period in which electric power is supplied from the control power supply 14. This period depends on the specification of the actuator 321 and is set to approximately 1 second, for example. In FIG. 11, although the changeover switch 172 is schematically illustrated as a double-pole, double-throw changeover switch, the changeover switch 172 may has an arbitrary configuration as long as it is possible to generate two types of pulsed voltages having reverse polarities. The changeover switch 172 is configured to output 0 V in a period in which no pulse is generated.

The changeover switch 172 can be formed of an electromagnetic relay having a double-pole, double-throw contact device, for example. The electromagnetic relay preferably includes a contact device in which a common contact selectively makes contact with first and second contacts and which can select a neutral state in which the common contact does not make contact with any one of the first and second contacts. Such a contact device includes two common contacts, two first contacts, and two second contacts. In the following description, a configuration which includes one common contact, one first contact, and one second contact will be referred to as one set. That is, the double-pole, double-throw contact device includes two sets.

When the changeover switch 172 is formed of an electromagnetic relay having a double-pole, double-throw contact device, as illustrated in FIG. 11, a series circuit formed of the control power supply 14 and the control switch 171 is connected between the two common contacts. Moreover, a first contact of a first set and a second contact of a second set are connected, and a second contact of the first set and a first contact of the second set are connected. The changeover switch 172 has two output lines, one output line serves as a connection point between the first contact of the first set and the second contact of the second set, and the other output line serves as a connection point between the second contact of the first set and the first contact of the second set.

In the above-described configuration, the polarity of the voltage output from the changeover switch 172 is reversed depending on whether the common contact is electrically connected to the first contact or the second contact. The changeover switch 172 selects whether the common contact will be electrically connected to the first contact or the second contact depending on whether charging or discharging of the storage battery 41 is performed or not. Moreover, by allowing the control switch 171 to be turned on in an appropriate period, it is possible to generate pulses having a pulse width corresponding to the ON period of the control switch 171 and having an amplitude corresponding to the output voltage of the control power supply 14.

The pulse generator 17 is not limited to a configuration with such a mechanical contact as described above but may be formed of an electronic circuit. This type of electronic circuit can be configured by combining a one-shot multivibrator and a three-state buffer having a bipolar output.

In the present embodiment, the actuator 321 of the switching mechanism 32 is assumed to have a single-winding, polar electromagnet. That is, the actuator 321 is a latch-type actuator and is configured to move a plunger just by temporarily supplying current to a coil and to allow the position of the plunger to be self-held. Moreover, the illustrated actuator 321 is configured to reverse the moving direction of the plunger by reversing the direction of the current flowing in the coil In the configuration example illustrated in FIG. 11, the coil of the actuator 321 is connected to the pulse generator 17 through the control lines 236 and 237 of the cable 20. Thus, when a pulsed driving voltage is generated from the pulse generator 17, the actuator 321 reverses the moving direction of the plunger according to the polarity of the driving voltage. In other words, the actuator 321 has a latch-type configuration that puts the switching mechanism 32 into the lock state and the unlock state according to the polarity of the pulsed driving voltage output by the pulse generator 17. With this configuration, the switching mechanism 32 select between the lock state and the unlock state according to the polarity of the pulse generated by the pulse generator 17.

Further, a disabling circuit 324 which is a series circuit formed of a diode D14 and a switching device 553 is connected in parallel to the coil of the actuator 321. The diode D14 is intervened in such a direction as to allow the passage of a pulse having such a polarity that changes the state of the switching mechanism 32 from the lock state to the unlock state when the switching device 553 enters the ON state. In the illustrated example, when the pulse generator 17 generates such a pulse that the upper end of the coil of the actuator 321 becomes a positive electrode, the switching mechanism 32 enters the unlock state.

Although the switching device 553 is connected to the processing module 33 and is normally in the OFF state, the switching device 553 enters the ON state when the processing module 33 detects a malfunction in the switching device 31 or 43. That is, when the body 301 of the connector 30 is in the attached state relative to the connecting port 42 of the electric vehicle 40, the switching mechanism 32 is in the lock state, if the processing module 33 determines that a malfunction has occurred in the switching device 31 or 43, the switching device 553 enters the ON state. When the switching device 553 enters the ON state, the pulse generated from the changeover switch 172 is bypassed through a path that passes through the diode D14. That is, the pulse output from the pulse generator 17 is not applied to the coil of the actuator 321, and the plunger of the actuator 321 cannot move. In other words, when the switching device 553 of the disabling circuit 324 enters the ON state, a driving voltage for putting the switching mechanism 32 into the unlock state is disabled. As a result, the switching mechanism 32 is maintained in the lock state, and the body 301 of the connector 30 is maintained in the attached state relative to the connecting port 42.

In the illustrated example, although the measuring module 333 monitors a malfunction in the switching device 31 of the connector 30 or the switching device 43 of the electric vehicle 40 by measuring the voltage between the electric paths 511 and 521, the measuring module 333 may measure the current flowing into the electric paths 511 and 512.

Figure 12:
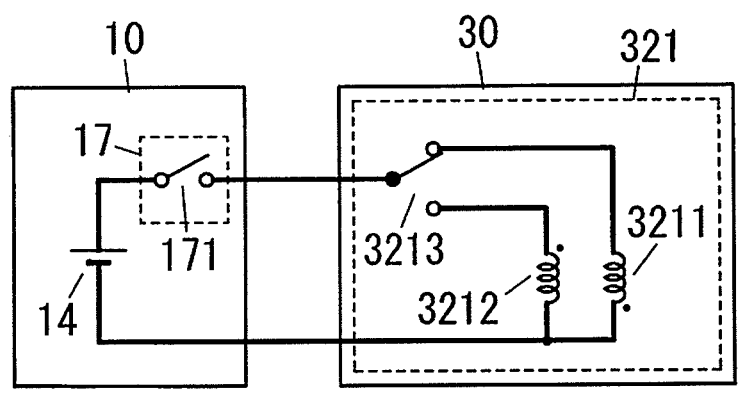
FIG. 12 is a circuit diagram of a partial portion illustrating a modified example used in Embodiment 8.

Moreover, in the configuration example described above, although an example of including the actuator 321 having a single-winding, polar electromagnet has been illustrated, as illustrated in FIG. 12, the actuator 321 with a double-winding, polar electromagnet may be employed. The actuator 321 includes a first coil 3211, a second coil 3212, and a selection switch 3213. The actuator 321 has a plunger which advances or retracts depending on which one of the first coil 3211 or the second coil 3212 will be made conductive.

The selection switch 3213 switches an electric path so that the first coil 3211 and the second coil 3212 are selectively made conductive. Moreover, the selection switch 3213 switches the electric path according to the position of the plunger that advances or retracts depending on the first and second coils 3211 and 3212. That is, when the first coil 3211 is made conductive and the plunger moves, the selection switch 3213 is connected to the second coil 3212. Moreover, when the second coil 3212 is made conductive and the plunger moves, the selection switch 3213 is connected to the first coil 3211. Thus, the plunger moves in opposite directions whenever the control switch 171 enters the ON state.

In the configuration illustrated in FIG. 12, the pulse generator 17 includes the control switch 171 only, and the moving direction of the plunger can be reversed whenever the control switch 171 enters the ON state. Thus, it is not necessary to generate bipolar pulses and the configuration of the pulse generator 17 is simplified.

According to the configuration of the present embodiment, when the voltage from the conversion circuit 11 is applied to the contactors 361 and 362 of the connector 30 or when the voltage of the storage battery 41 is applied to the contactors 421 and 422 of the connecting port 42, the switching device 553 enters the ON state and the lock state is maintained. That is, when the determining module 330 that determines the state of the electric paths 511 and 512 determines that it is not possible to release the lock state, the determining module 330 turns the switching device 553 on. As a result, electric power based on the pulses from the pulse generator 17 is not supplied to the coil of the actuator 321 and the lock state is maintained.

In the configuration of the present embodiment, since the latch-type actuator 321 is provided for the connector 30, the switching mechanism 32 maintains the lock state unless electric power is supplied to the actuator 321 based on the pulses from the pulse generator 17 in the lock state. In other words, even when the cable 20 is disconnected or the coil of the actuator 321 is shorted (breaks), the lock state is maintained and a fail-safe switching mechanism is realized.

The connector 30 of the present embodiment described above includes the body 301, the switching mechanism 32, the processing module 33, and the disabling circuit 324. The attached state and the unattached state of the body 301 relative to the connecting port 42 provided in an apparatus (the electric vehicle 40) having a battery (the storage battery 41) mounted therein can be selected. The switching mechanism 32 includes the latch-type actuator 321 that operates when a pulsed driving voltage is applied. Further, the switching mechanism 32 is configured, when the body 301 is in the attached state relative to the connecting port 42, to select between a lock state in which removal of the body 301 from the connecting port 42 is inhibited and an unlock state in which removal of the body 301 from the connecting port 42 is allowed. The processing module 33 is configured to determine that a malfunction has occurred when a voltage is applied to a portion that electrically connects the connector 30 and the connecting port 42 in a period in which transmission of electric power with respect to the battery (the storage battery 41) is stopped. The disabling circuit 324 disables the driving voltage so that a driving voltage for putting the switching mechanism 32 into the unlock state is not applied to the actuator 321 in a period in which the processing module 33 determined that a malfunction had occurred.

Thus, in the connector 30 of the present embodiment, the processing module 33 provided in the connector 30 can detect a malfunction. Here, the period in which transmission of electric power with respect to the battery (the storage battery 41) is stopped corresponds to a period excluding a charging period or a discharging period, and the portion that electrically connects the connector 30 and the connecting port 42 corresponds to the contactors 361 and 362 or the contactors 421 and 422. Thus, the processing module 33 determines that a malfunction has occurred when a voltage of the power conversion device 10 or the battery (the storage battery 41) is applied to the contactors 361 and 362 or the contactors 421 and 422 in the period excluding the charging or discharging period. That is, the processing module 33 can determine that a malfunction has occurred when a voltage is applied to the contactors 361 and 362 or the contactors 421 and 422 although charging or discharging is not performed.

Moreover, since the actuator 321 is a latch-type actuator, and the amount of electric power required for switching between the lock state and the unlock state is small, the actuator 321 operates with small electric power, and an increase in power consumption is suppressed. That is, the connector 30 of the present embodiment can maintain the lock state without consuming electric power when weld or the like occurs in the contacts 311 and 312 of the switching device 31 or the contacts 431 and 432 of the switching device 43.

Further, when the processing module 33 has detected a malfunction, since the driving voltage for switching the state of the switching mechanism 32 from the lock state to the unlock state is disabled by the disabling circuit 324, the switching mechanism 32 is prevented from entering the unlock state in the event of a malfunction and maintains the lock state. In other words, it is not necessary to provide control lines for maintaining the lock state and consumption of a limited number of electric paths of the cable 20 is suppressed.

The other configuration and function of the present embodiment are the same as the configuration and function of Embodiment 2. That is, although FIG. 11 illustrates only main constituent elements required for description of the present embodiment, the other constituent elements are provided according to Embodiment 1. Moreover, the configurations of the embodiments described above may be appropriately combined with the configuration of the present embodiment. For example, in the configuration example illustrated in FIG. 11, although a malfunction in the switching device 31 or 43 is detected with the processing module 33 described in Embodiment 3, the processing module 33 having the configuration described in Embodiments 1 and 2 may be used.

Embodiment 9

Figure 13:
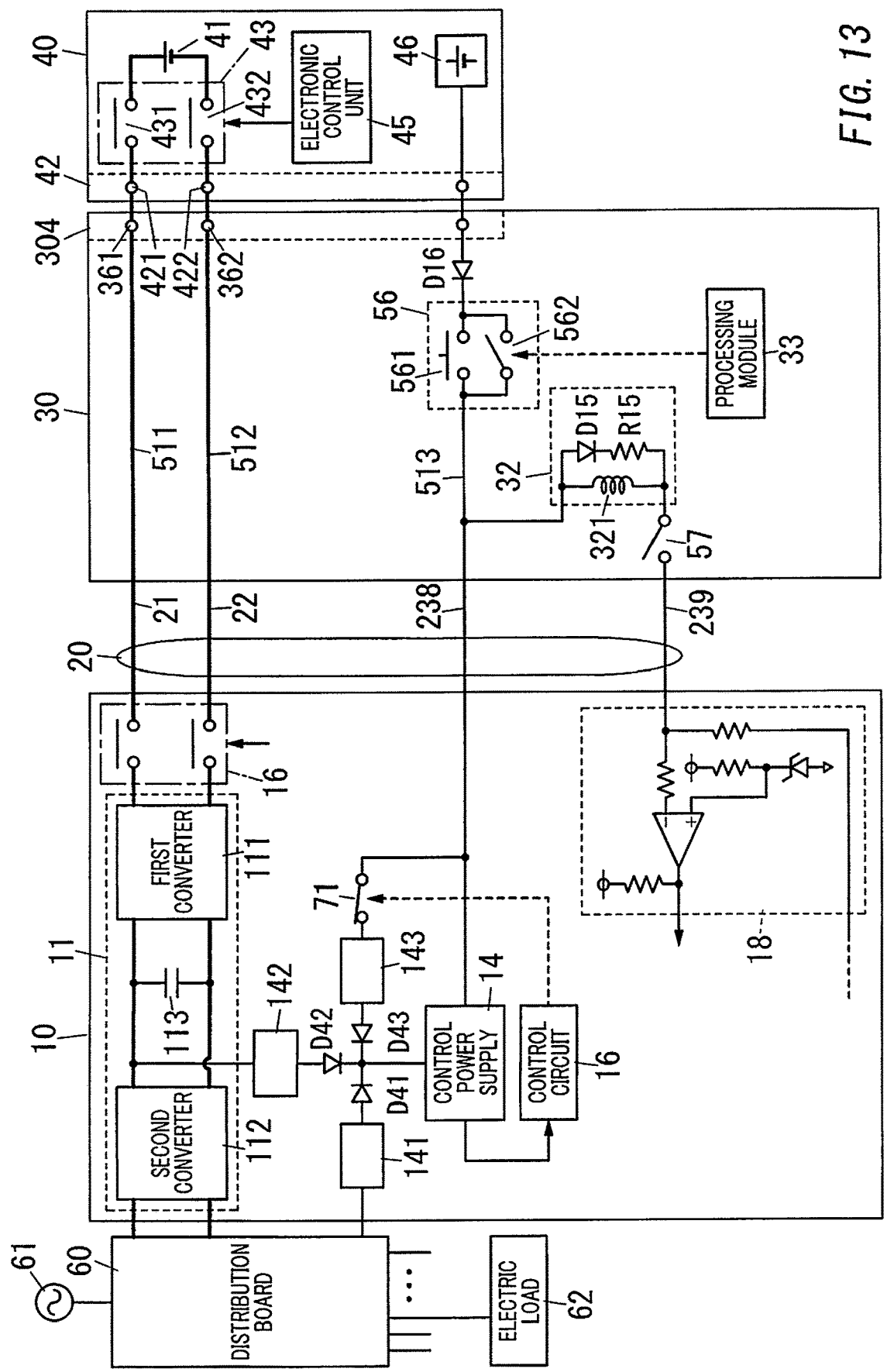
FIG. 13 is a diagram illustrating a configuration of Embodiment 9.

As illustrated in FIG. 13, a power conversion device 10 of the present embodiment includes a conversion circuit 11, a control power supply 14, and a control circuit 16. In the present embodiment, the same constituent elements as those described in Embodiment 1 will be denoted by the same reference numerals, and the description thereof will not be provided.

In the present embodiment, among the functions of the conversion circuit 11, a function of converting the electric power from a storage battery 41 as a first battery mounted in an electric vehicle 40 into AC electric power equivalent to a system power supply 61 will be described. Thus, the storage battery 41 mounted in the electric vehicle 40 can be replaced with a fuel cell battery. However, similarly to the embodiments described above, the power conversion device 10 may have a function of charging the storage battery 41. That is, even when the power conversion device 10 converts electric power bidirectionally between AC electric power and DC electric power, the technique of the present embodiment can be applied.

The power conversion device 10 of the present embodiment is used together with the storage battery 41 mounted in the electric vehicle 40 to form a distributed power supply for the system power supply 61 provided by an electric operator. The electric operator means an operator who obtains a compensation for the supply of electric power and is not limited to a power company. Moreover, the control circuit 16 controls the operation of the conversion circuit 11 and the control power supply 14 receives electric power from at least one of the distribution board 60 and the conversion circuit 11 and supplies electric power to the control circuit 16.

The attached state and the unattached state of the connector 30 relative to the connecting port 42 provided in the electric vehicle 40 are selected. The electric paths 511 and 512 included in the electric path between the storage battery 41 and the conversion circuit 11 are formed in the connector 30. Further, the connector 30 also forms an auxiliary electric path 513 that supplies electric power to the control power supply 14 from the on-vehicle battery 46 as a second battery mounted in the electric vehicle 40 in order to supply electric power to facilities provided in the electric vehicle 40.

The cable 20 that connects the power conversion device 10 and the connector 30 includes power supply lines 21 and 22 connected to the electric paths 511 and 512, a control line 238 connected to the auxiliary electric path 513, and a control line 239 connected to a determination circuit 18 described later. The control lines 238 and 239 can be selected from the control lines 231 to 235 described in Embodiment 1.

The connector 30 preferably includes a switching device 56 intervened in the auxiliary electric path 513 between the on-vehicle battery 46 and the control line 238 of the cable 20. In the illustrated example, the switching device 56 has a configuration in which a switch 561 and a contact device 562 are connected in parallel. The switching device 56 opens the auxiliary electric path 513 between the control power supply 14 and the on-vehicle battery 46 in a period in which the control power supply 14 receives electric power from any one of the distribution board 60 and the conversion circuit 11. Moreover, the switching device 56 makes the electric path between the control power supply 14 and the on-vehicle battery 46 conductive in a period in which the supply of electric power from the power system and the conversion circuit 11 to the control power supply 14 is stopped. The switching device 56 may be a momentary switch included in the connector 30.

The electric path between the control power supply 14 and the on-vehicle battery 46 also functions as an electric path that allows a current to flow from the control power supply 14 to the actuator 321 of the switching mechanism 32. The switching device 56 is preferably intervened between the on-vehicle battery 46 and the actuator 321. The actuator 321 includes a non-polar electromagnet. In the power conversion device 10, the voltage value that the control power supply 14 outputs to the control line 238 is preferably set to be higher than the voltage value output by the on-vehicle battery 46.

A surge absorption circuit which is a series circuit of a diode D15 and a resistor R15 is connected in parallel to the coil of the actuator 321. Moreover, a switch 57 that enters the ON state when the connector 30 is inserted into the connecting port 42 is connected in series to the actuator 321. Thus, in a state in which the connector 30 is inserted into the connecting port 42, when the switch 57 enters the ON state and the actuator 321 is made conductive, the attached state of the connector 30 relative to the connecting port 42 is maintained.

The conduction state of the actuator 321 is monitored by the determination circuit 18, and the determination circuit 18 indirectly monitors a state in which the connector 30 is connected to the connecting port 42 based on the conduction state of the actuator 321.

The power conversion device 10 includes the conversion circuit 11 that charges and discharges the storage battery 41. The conversion circuit 11 includes a first converter 111 that converts DC electric power into DC electric power and a second converter 112 that converts DC electric power into AC electric power. The first and second converters 111 and 112 transmit DC electric power bidirectionally via an intermediate bus. Moreover, a smoothing capacitor 113 is connected between the lines of the intermediate bus. The first converter 111 is connected to the connector 30 via a switching device 19. The AC side of the second converter 112 is connected to the distribution board 60. The switching device 19 is preferably configured such that the electric path can be opened or closed according to an external signal like a relay (an electromagnetic contactor).

When the storage battery 41 is charged, the AC electric power received from the system power supply 61 is converted into the DC electric power by the second converter 112. Moreover, the first converter 111 is used to adjust the voltage and current conditions when charging the storage battery 41. On the other hand, when the electric power of the storage battery 41 is supplied to the power system, the DC electric power output from the storage battery 41 is input to the first converter 111 and the voltage thereof is adjusted and is then converted into the AC electric power by the second converter 112. The second converter 112 adjusts the frequency and the phase of the AC electric power generated from the electric power of the storage battery 41 in order to supply the AC electric power to the power system.

The first and second converters 111 and 112 are configured to convert electric power through a switching device and the turning on/off of the switching device is controlled by the control circuit 16. Moreover, the electric power for operating the control circuit 16 is supplied from the control power supply 14. The control circuit 16 cannot be operated unless electric power is supplied to the control power supply 14, and as a result, the operation of the conversion circuit 11 stops.

In the configuration of the present embodiment, the control power supply 14 is configured to receive electric power from the power system and the conversion circuit 11 and is also configured to receive electric power from the on-vehicle battery 46 that supplies electric power to facilities provided in the electric vehicle 40. The power conversion device 10 preferably includes a power reception controller that inhibits the control power supply 14 from receiving electric power from the on-vehicle battery 46 in a period in which the control power supply 14 receives electric power from any one of the power system and the conversion circuit 11. In the configuration example illustrated in FIG. 13, the power reception controller is formed of a contact device 71.

A power supply circuit 141 and a diode D41 are intervened in a power feeding path along which electric power is supplied from the distribution board 60 to the control power supply 14, and a power supply circuit 142 and a diode D42 are intervened in a power feeding path along which electric power is supplied from the conversion circuit 11 to the control power supply 14. Further, a contact device 71 as a power reception controller, a power supply circuit 143, and a diode D43 are intervened in a path along which the control power supply 14 receives electric power from the on-vehicle battery 46. The cathodes of the diodes D41 to D43 are connected commonly to the control power supply 14, and back-flow of current to different power supply circuits 141 to 143 is prevented. The function of the contact device 71 will be described later.

The connector 30 forms an electric path between the control power supply 14 and the on-vehicle battery 46 in order to allow the control power supply 14 to receive electric power from the on-vehicle battery 46 as well as forming an electric path between the storage battery 41 and the conversion circuit 11 when the connector 30 is in the attached state relative to the connecting port 42. As described above, the connector 30 includes the switching device 56 intervened in the electric path between the control power supply 14 and the on-vehicle battery 46.

Since it is not possible to use the electric power of the storage battery 41 until a communication establishing process, a checking process, and the like end after the connector 30 is attached to the connecting port 42, the control power supply 14 generally receives electric power from the system supply source 41 when charging or discharging of the storage battery 41 starts. When the control power supply 14 receives electric power from the system supply source 41 and the control circuit 16 starts operating, the conversion circuit 11 is activated. After that, the processes such as a communication establishing process and a checking process end, the switching device 43 enters the ON state and the storage battery 41 and the conversion circuit 11 are electrically connected. In this manner, it is necessary to wait for a necessary period until the charging or the discharging of the storage battery 41 can be performed after the connector 30 is attached to the connecting port 42.

In the illustrated example, the switching device 56 is a parallel circuit of the momentary switch 561 and the contact device 562 of the relay. The contact device 562 is normally maintained in the OFF state. The momentary switch 561 generally includes a push button-type operator and enters the ON state in a period in which the operator is pressed only. Here, the contact device 562 means a mechanical contact of an electromagnetic relay or a switching device of a semiconductor relay. In the connector 30, a backflow prevention diode D16 is intervened between the connecting port 42 and the switch 561.

Since the switching device 56 is intervened in an electric path between the control power supply 14 and the on-vehicle battery 46 in order to supply electric power from the on-vehicle battery 46 to the control power supply 14, electric power is supplied from the on-vehicle battery 46 to the control power supply 14 in the ON period of the switching device 56 only. That is, in the OFF period of the contact device 562, electric power is supplied from the on-vehicle battery 46 to the control power supply 14 only in the ON period of the switch 561 provided in the connector 30. Conversely, unless the switch 561 is operated, the electric power of the on-vehicle battery 46 is not consumed by the control power supply 14, and a decrease in the capacity of the on-vehicle battery 46 is suppressed.

When the switching device 56 is in the OFF state, the control power supply 14 is supplied with electric power from any one of the system power supply 41 and the conversion circuit 11. Moreover, in the event of interruption in which the supply of electric power from the system power supply 41 stops, the electric power of the storage battery 41 is supplied to the control power supply 14 through the intermediate bus of the conversion circuit 11. In this case, the electric power of the storage battery 41 is also supplied to the power system through the conversion circuit 11. Thus, in the event of interruption, electric loads connected to the power system can be operated by the electric power stored in the storage battery 41. Such an operation is referred to as self-powered driving. In a self-powered driving mode, since it is not possible to connect to the power system, electric power is output to a self-powered driving receptacle that is not connected to the power system.

The self-powered driving is performed only in a state in which the connector 30 is connected to the connecting port 42. Thus, it is determined whether or not to perform self-powered driving in a state in which it is recognized based on the output of the determination circuit 18 that the connector 30 is connected to the connecting port 42.

As described above, in the self-powered driving period, electric power is supplied from the storage battery 41 to the control power supply 14 through the conversion circuit 11. However, in order to allow the control power supply 14 to receive electric power from the conversion circuit 11 after the system power supply 41 is interrupted, it is necessary to operate the conversion circuit 11 so that DC electric power can be supplied from the storage battery 41 to the control power supply 14. That is, the operation of the conversion circuit 11 needs to be changed in order to supply electric power from the storage battery 41 to the control power supply 14 after the system power supply 41 is interrupted.

When the operation of the conversion circuit 11 is changed due to interruption of the system power supply 41, it is not possible to obtain electric power from the system power supply 41 until electric power can be supplied from the storage battery 41 to the control power supply 14. Moreover, in this period, it is not possible to supply electric power to the control power supply 14 since a state in which the conversion circuit 11 can use the electric power from the storage battery 41 is not created. Thus, in the present embodiment, the electric power of the on-vehicle battery 46 is supplied to the control power supply 14, whereby the electric power of the control power supply 14 in a transition period is compensated.

In other words, since it is necessary to supply electric power from the on-vehicle battery 46 to the control power supply 14 only in the transition period, it is preferable to stop the supplying electric power from the on-vehicle battery 46 to the control power supply 14 in a period in which the control power supply 14 receives electric power from the system power supply 41 or the conversion circuit 11. Thus, the momentary switch 561 is used in the switching device 56, the switch 561 is operated in the transition period only, and the switch 561 is not operated after the operation of the conversion circuit 11 ends. In this way, the electric power of the on-vehicle battery 46 is not consumed unnecessarily. As described above, the contact device 562 is normally maintained in the OFF state.

Moreover, since the switch 561 is a momentary switch, even when the switch 561 is operated erroneously, an operation mode does not transition to the self-powered driving mode if the switch 561 returns to the OFF state before a necessary period elapses until the communication establishing process and the checking process end. Thus, by providing the momentary switch 561, transition to the self-powered driving mode based on an erroneous operation is obviated.

That is, in a period in which the control power supply 14 receives electric power from any one of the power system and the conversion circuit 11, the switching device 56 is in the OFF state, and the electric path between the control power supply 14 and the on-vehicle battery 46 is opened. Moreover, in a period in which the power system and the conversion circuit 11 stops supplying electric power to the control power supply 14, the switching device 56 is in the ON state, and the electric path between the control power supply 14 and the on-vehicle battery 46 is made conductive.

As described above, the contact device 71 as a power reception controller is also intervened in the power feeding path along which electric power is supplied from the on-vehicle battery 46 to the control power supply 14. The contact device 71 enters an OFF state in order to inhibit the control power supply 14 from receiving electric power from the on-vehicle battery 46 in a period in which the control power supply 14 receives electric power from any one of the system power supply 41 and the conversion circuit 11. The contact device 71 is a relay that has a normally closed contact, for example. After the system power supply 41 is interrupted, as described above, when the conversion circuit 11 is activated by the electric power of the on-vehicle battery 46 and the supply of electric power from the conversion circuit 11 to the control power supply 14 starts, the contact device 71 enters an OFF state upon receiving an instruction from the control circuit 16.

With the above-described operation of the contact device 71, even when the switch 561 or the contact device 562 is in the ON state, the contact device 71 enters the OFF state if electric power is supplied from the conversion circuit 11 to the control power supply 14. Thus, the amount of electric power supplied from the on-vehicle battery 46 to the control power supply 14 is limited, and the consumption of power of the on-vehicle battery 46 is suppressed.

The actuator 321 is connected between the switching device 56 and the control power supply 14 in the electric path between the control power supply 14 and the on-vehicle battery 46. That is, the electric path between the control power supply 14 and the on-vehicle battery 46 also functions as an electric path along which electric power is supplied from the on-vehicle battery 46 to the control power supply 14 and an electric path along which current flows from the control power supply 14 to the actuator 321. Moreover, the switching device 56 is intervened between the on-vehicle battery 46 and the actuator 321.

In this configuration, a path along which electric power is supplied to the actuator 321 is connected commonly to two paths of a path from the control power supply 14 to the actuator 321 and a path from the on-vehicle battery 46 to the actuator 321. The power feeding path along which electric power is supplied from the on-vehicle battery 46 to the control power supply 14 can be made independent from the power feeding path along which electric power is supplied from the control power supply 14 to the actuator 321. In contrast, since this configuration shares the two power feeding paths, it is possible to effectively use electric wires without increasing the number of electric wires of the cable 20 that connects the connector 30 and the power conversion device 10.

In the above-described configuration, the path along which electric power is supplied from the on-vehicle battery 46 to the control power supply 14 overlaps a portion of the path along which electric power is supplied from the control power supply 14 to the actuator 321. Thus, the voltage value output from the control power supply 14 to the electric path between the control power supply 14 and the on-vehicle battery 46 is set to be higher than the voltage value output from the on-vehicle battery 46 to the electric path between the control power supply 14 and the on-vehicle battery 46. In this manner, the supply of electric power from the control power supply 14 to the actuator 321 occurs in preference to the supply of electric power from the on-vehicle battery 46 to the control power supply 14.

However, if the switching device 43 is in the closed state when the connector 30 is separated from the connecting port 42, the voltage output from the storage battery 41 is applied to the contactor of the connecting port 42. In this state, it is not desirable to separate the connector 30 from the connecting port 42.

Thus, a process of putting the switching device 43 into the open state is performed before the connector 30 is separated from the connecting port 42, and then, it is determined whether the contacts 431 and 432 of the switching device 43 are in the open state. Here, when the switching device 43 is in the closed state, the conduction state of the actuator 321 is maintained so that the connector 30 is not separated from the connecting port 42. To enable this operation, the processing module 33 determines whether the contacts 431 and 432 of the switching device 43 are in the open state and puts the contact device 562 into the ON state in order to maintain the conduction state of the actuator 321. The operation of the processing module 33 of the present embodiment is the same as the configuration described in Embodiment 2.

Since the power feeding path from the on-vehicle battery 46 to the actuator 321 is formed when the contact device 562 enters the ON state, the actuator 321 is supplied with electric power from the on-vehicle battery 46 even when electric power is not supplied from the system power supply 41 or the conversion circuit 11 to the control power supply 14. Thus, the connector 30 is not separated from the connecting port 42, and the user can be informed of a malfunction in the switching device 43 based on the determination result suggested by the processing module 33. The technique described in Embodiment 1 is employed in the technique of presenting the determination result.

Figure 14:
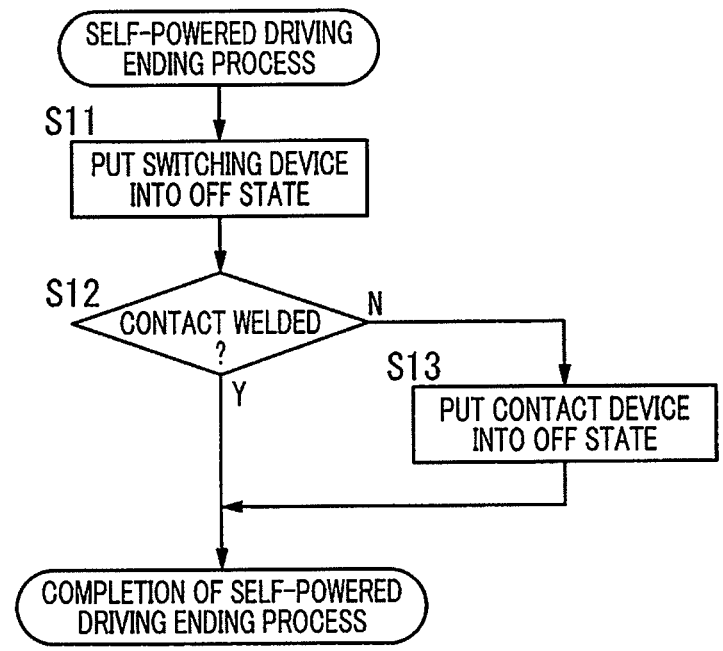
FIG. 14 is a flowchart illustrating an operation of Embodiment 9.

On the other hand, when self-powered driving ends from a state in which self-powered driving is performed, the operation illustrated in FIG. 14 may be performed. That is, when an instruction to end the self-powered driving is received, the processing module 33 puts the contact device 562 into the ON state regardless of whether the switching device 43 is in the open state or the closed state. Subsequently, the supply of electric power from the control power supply 14 to the switching device 43 stops so that the switching device 43 enters the open state (S11). Here, the processing module 33 determines whether the contacts 431 and 432 of the switching device 43 are welded (S12). When the contacts 431 and 432 are not welded (S12: N), the processing module 33 puts the contact device 562 into the OFF state (S13). On the other hand, when the contacts 431 and 432 are welded (S12: Y), the processing module 33 maintains the contact device 562 in the ON state. In step S12 of FIG. 14, although it is determined whether the contacts 431 and 432 of the switching device 43 are welded, it may be determined whether the switching device 43 is in the open state or the closed state.

Figure 15:
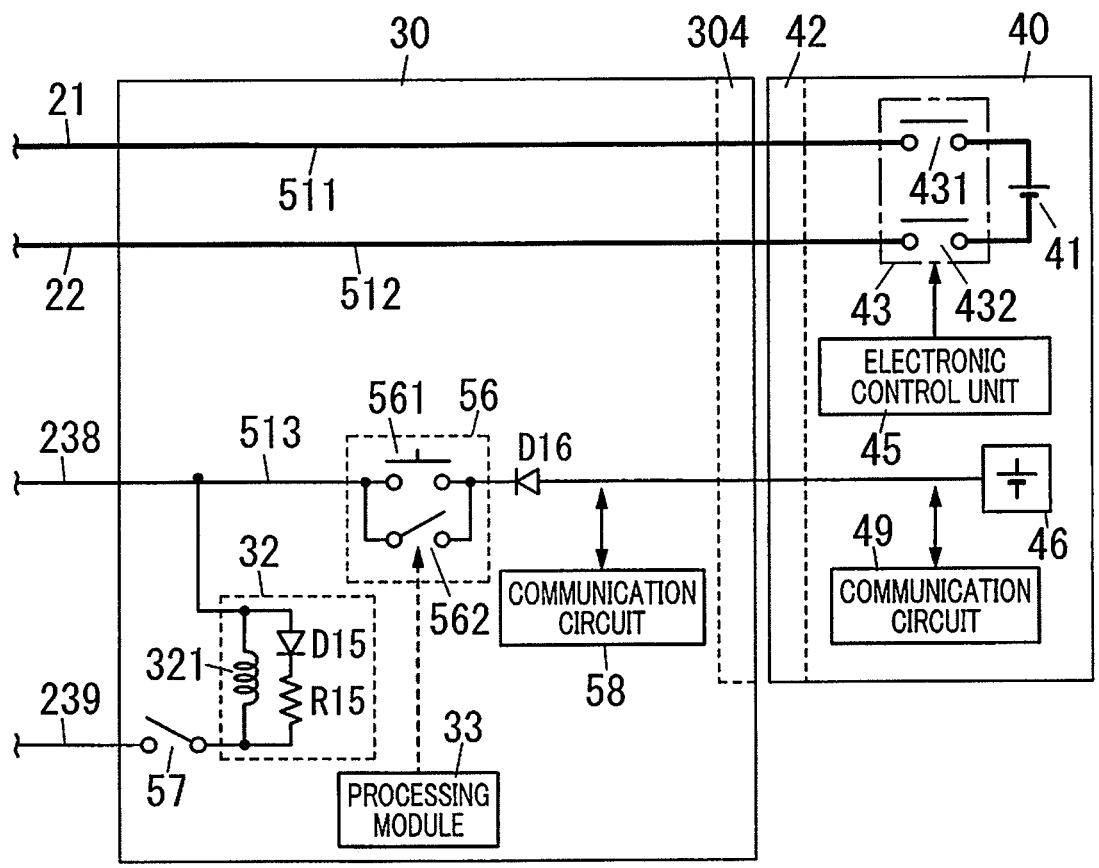
FIG. 15 is a diagram illustrating a configuration of a partial portion of a modified example of Embodiment 9.

In the configuration example described above, although a path along which signals are transmitted between the power conversion device 10 and the electric vehicle 40 is not described particularly, signals may be transmitted through a contactor provided separately from the contactors 361 and 362 that perform charging and discharging. However, since these contactors have a limited number of poles, the electric path along which electric power is supplied to the control power supply 39 (see FIG. 1) which is a second control power supply that supplies electric power from the on-vehicle battery 46 to the processing module 33 or the like may also serve as the signal line 23. That is, a necessary signal may be superimposed on the voltage of the electric path, and the electric path may also serve as a transmission path for transmission of electric power and signals. When the electric path is used for a signal transmission path, as illustrated in FIG. 15, a communication circuit 49 is provided in the electric vehicle 40, and a communication circuit 58 is provided in the connector 30.

When this configuration is employed, rather than transmitting signals from the electric vehicle 40 to the connector 30 through the power conversion device 10, signals can be transmitted directly from the electric vehicle 40 to the connector 30. Thus, for example, when a switching device is provided inside the connector 30, it is possible to quickly open the switching device inside the connector 30 in the event of a malfunction detected in the electric vehicle 40.

Moreover, in the above-described configuration example, the user operates the switch 561 in the event of interruption of the system power supply 41 so that the vehicle enters the self-powered driving mode. In contrast, when an interruption detection circuit that detects an interruption of the system power supply 61 is provided in the power conversion device 10, it is possible to allow the switch 561 to enter the ON state after the elapse of a predetermined period from the detection of the interruption. When the interruption detection circuit is provided in this manner and the system power supply 61 is reactivated, the processing module 33 is operated to determine whether the switching device 43 is in the open state.

The power conversion system of the present embodiment described above includes the conversion circuit 11, the control circuit 16, the control power supply 14, and the connector 30. The conversion circuit 11 converts the electric power from a first battery (the storage battery 41) mounted in an apparatus (the electric vehicle 40) into electric power that is supplied to a power system (the distribution board 60). The control circuit 16 controls the operation of the conversion circuit 11. The control power supply 14 receives electric power from at least one of the power system (the distribution board 60) and the conversion circuit 11 and supplies electric power to the control circuit 16. The attached state and the unattached state of the connector 30 relative to the connecting port 42 provided in the apparatus (the electric vehicle 40) can be selected, and the connector 30 forms the electric paths 511 and 512 between the first battery (the storage battery 41) and the conversion circuit 11. Further, the connector 30 forms the auxiliary electric path 513 along which electric power is supplied from a second battery (the on-vehicle battery 46) mounted in the apparatus (the electric vehicle 40) to the control power supply 14.

According to this configuration, the electric power for operating the control circuit 16 is secured by the second battery (the on-vehicle battery 46). Thus, the conversion circuit 11 can perform an operation until the control power supply 14 becomes able to receive electric power from the conversion circuit 11 after the control power supply 14 became unable to receive electric power from the power system. That is, in this period, the control circuit 16 can operate only by the second battery (the on-vehicle battery 46) mounted in the apparatus (the electric vehicle 40) without another power supply. Moreover, since the electric power of the second battery (the on-vehicle battery 46) is used for activation of the conversion circuit 11, when electric power is supplied from the first battery (the storage battery 41) to the power system, the remaining capacity of the first battery (the storage battery 41) is not affected.

The other configuration and operation of the present embodiment except the above-described configuration and operation are the same as those of Embodiment 1. That is, although FIG. 13 illustrates only main constituent elements required for description of the present embodiment, the other constituent elements are provided according to Embodiment 1. Moreover, the configurations of the embodiments described above may be appropriately combined with the configuration of the present embodiment. In the present embodiment, although the electric vehicle 40 is illustrated as an example of the apparatus, the technique described in the present embodiment can be applied to an apparatus other than the electric vehicle 40 as long as the apparatus has the storage battery 41 or a fuel cell battery mounted therein. When the apparatus is not the electric vehicle 40, the second battery which is not a main energy source needs to be mounted in the apparatus instead of the on-vehicle battery 46.

The embodiments described above are examples of the present invention. Thus, the present invention is not limited to the embodiments described above but may be embodied in other forms, and various changes can be made according to design or the like without departing from the technical scope of the present invention.

The invention claimed is:

1. A power conversion system comprising:
a power conversion device configured to be connected to a power system;
a connector whose attached state and unattached state relative to a connecting port provided in an apparatus having a battery mounted therein can be selected;
a processing module configured to determine occurrence of a malfunction;
a switching device which intervenes in an electric path between the power conversion device and the battery in the connector, the switching device is configured so that closed state in which the electric path is made conductive and open state in which the electric path is made non-conductive are selected; and
a switching mechanism configured to allow the switching device to enter the closed state when the connector is in the attached state in the connector and places the switching device in the open state when the connector is in the unattached state,
wherein
the processing module comprises:
a first detector configured to detect whether the switching device is in the open state or the closed state;
a second detector configured to detect whether the connector is in the attached state or the unattached state; and
a determining module configured to determine that the malfunction has occurred when both a first condition and a second condition are satisfied,
the first condition is that the first detector detects the closed state, and
the second condition is that the second detector detects the unattached state.

2. The power conversion system according to claim 1, wherein
the first detector and the second detector are provided in the connector.

3. The power conversion system according to claim 1, wherein
the switching device includes a main contact that opens and closes the electric path and an auxiliary contact that is opened or closed in synchronization with the main contact, and
the first detector is configured to detect whether the switching device is in the open state or the closed state by monitoring a contact state of the auxiliary contact.

4. A power conversion system comprising:
a power conversion device configured to be connected to a power system;
a connector whose attached state and unattached state relative to a connecting port provided in an apparatus having a battery mounted therein can be selected; and
a processing module configured to determine occurrence of a malfunction, wherein
the processing module comprises:
a measuring module configured to measure a voltage value at a measurement point set in the electric path between the switching device and the battery in the connector; and
a determining module configured to compare the voltage value measured by the measuring module with a predetermined threshold, and
the determining module is configured to determine that a malfunction has occurred when both a first condition and a second condition are satisfied,
the first condition is that the voltage value measured by the measuring module exceeds the threshold, and
the second condition is that a second switching device intervened in a second electric path provided between the battery and the connecting port makes the second electric path non-conductive.

5. The power conversion system according to claim 4, wherein
the determining module is configured to determine that a malfunction has occurred in the second switching device when the voltage value measured by the measuring module exceeds the threshold in a state in which electric power is not output from the power conversion device and the second switching device is instructed to enter the open state in which the second electric path is made non-conductive.

6. The power conversion system according to claim 4, wherein
the connector comprises a discharging module configured to discharge residual charges generated by a capacitive component between the second switching device and the power conversion device in the electric path between the power conversion device and the battery.

7. The power conversion system according to claim 6, wherein
the discharging module also functions as the measuring module.

8. The power conversion system according to claim 2, wherein
the processing module is provided in the connector, and
the connector comprises a notification module configured to notify the power conversion device of a binary signal indicating a result of determination by the processing module.

9. A power conversion system comprising:
a conversion circuit configured to convert electric power from a first battery that is mounted in an electric vehicle as a traction battery into electric power that is supplied to a power system;
a control circuit configured to control an operation of the conversion circuit;
a control power supply configured to receive electric power from at least one of the power system and the conversion circuit and to supply electric power to the control circuit; and
a connector whose attached state and unattached state relative to a connecting port provided in the electric vehicle can be selected and which forms an electric path between the first battery and the conversion circuit, wherein
the connector forms an auxiliary electric path along which electric power is supplied to the control power supply from a second battery mounted in the electric vehicle and serving as a power source for an on-board device of the electric vehicle.

10. The power conversion system according to claim 9, further comprising:
a switching device configured to open the auxiliary electric path in a period in which the control power supply receives electric power from one of the power system and the conversion circuit and to make the auxiliary electric path conductive in a period in which the supply of electric power from the power system and the conversion circuit to the control power supply is stopped.

11. The power conversion system according to claim 10, wherein
the connector comprises an actuator configured to be made conductive when the connector is in the attached state relative to the connecting port so that the attached state relative to the connecting port is maintained,
the auxiliary electric path also functions as an electric path along which electric power is supplied from the control power supply to the actuator, and
the switching device is intervened between the second battery and the actuator.

12. The power conversion system according to claim 11, wherein
a voltage value that the control power supply outputs to the auxiliary electric path is set to be higher than a voltage value that the second battery outputs to the auxiliary electric path.

13. The power conversion system according to claim 11, further comprising:
a power reception controller configured to inhibit the control power supply from receiving electric power from the second battery in a period in which the control power supply receives electric power from one of the power system and the conversion circuit.

14. The power conversion system according to claim 10, wherein
the switching device is a momentary switch included in the connector.

15. The power conversion system according to claim 10, further comprising:
a processing module configured to determine presence or absence of weld of a switching device intervened between the first battery and the connecting port and to send an instruction to allow the switching device to be maintained in an ON state when weld of the switching device is detected.

16. The power conversion system according to claim 10, wherein
an electric path along which electric power is supplied from the second battery to a second control power supply provided in the connector also functions as a signal transmission path.

17. The power conversion system according to claim 1, wherein
the apparatus is an electric vehicle that has a storage battery mounted as the battery and employs the storage battery as a travelling energy source.

18. A connector comprising:
a body whose attached state and unattached state relative to a connecting port provided in an apparatus having a battery mounted therein can be selected;
a switching mechanism that includes an actuator and is configured, when the body is in the attached state relative to the connecting port, to select between a lock state in which removal of the body from the connecting port is inhibited and an unlock state in which removal of the body from the connecting port is allowed;
a first power feeding module configured to supply electric power from a power conversion device connected to a power system to the actuator; and
a second power feeding module configured to supply electric power from at least the apparatus to the actuator, wherein
the actuator is configured to place the switching mechanism in the lock state in a period in which electric power is supplied and to place the switching mechanism in the unlock state in a period in which electric power is not supplied.

19. The connector according to claim 18, wherein
the first power feeding module is configured to receive electric power from the power conversion device through a path separate from an electric path between the power conversion device and the battery, and
the second power feeding module is configured to receive electric power from the electric path between the power conversion device and the battery.

20. The connector according to claim 18, further comprising:
a switching circuit in which a switching device intervened between the first and second power feeding modules and the actuator is provided, wherein
the first power feeding module is configured to receive electric power from the power conversion device through a path separate from an electric path between the power conversion device and the battery,
the second power feeding module is configured to receive electric power from an auxiliary power supply provided in the apparatus through a path separate from the electric path, and
the switching circuit includes a controller configured to place the switching device in an ON state when at least one of a voltage value received by the first power feeding module and a voltage value of the electric path is equal to or higher than a predetermined threshold.

21. The connector according to claim 18, further comprising:
a switching circuit in which a switching device intervened between the first and second power feeding modules and the actuator is provided, wherein
the first power feeding module is configured to receive electric power from the power conversion device through a path separate from an electric path between the power conversion device and the battery,
the second power feeding module is configured to receive electric power from an auxiliary power supply provided in the apparatus through a path separate from the electric path,
the switching device is a self-holding switching device,
the switching circuit is configured to place the switching device in the ON state when a voltage value received by the first power feeding module rises and to place the switching device in an OFF state when the voltage value falls, and
the first power feeding module includes a backflow prevention diode between a portion that receives electric power from the power conversion device and a portion that supplies electric power to the actuator.

22. The connector according to claim 19, wherein
the first power feeding module is configured to receive electric power from the power conversion device through a path separate from an electric path between the power conversion device and the battery and to supply electric power to the actuator, and
the second power feeding module is configured to receive electric power from an auxiliary power supply provided in the apparatus through a path separate from the electric path and to supply electric power to the actuator.

23. A connector comprising:
a body whose attached state and unattached state relative to a connecting port provided in an apparatus having a battery mounted therein can be selected;

a switching mechanism that includes a latch-type actuator configured to operate, when a pulsed driving voltage is applied, and that is configured, when the body is in the attached state relative to the connecting port, to select between a lock state in which removal of the body from the connecting port is inhibited and an unlock state in which removal of the body from the connecting port is allowed;

a processing module configured to determine that a malfunction has occurred when a voltage is applied to a portion that electrically connects the connector and the connecting port in a period in which transmission of electric power with respect to the battery is stopped; and a disabling circuit configured to disable the driving voltage so that the driving voltage that places the switching mechanism in the unlock state is not applied to the actuator in a period in which the processing module has determined that a malfunction had occurred.

24. The connector according to claim 18, wherein the apparatus is an electric vehicle that has a storage battery mounted as the battery and employs the storage battery as a travelling energy source.

* * * * *